United States Patent
Perkowski et al.

(10) Patent No.: US 10,817,324 B2
(45) Date of Patent: Oct. 27, 2020

(54) SYSTEM AND METHOD OF CROSS-SILO DISCOVERY AND MAPPING OF STORAGE, HYPERVISORS AND OTHER NETWORK OBJECTS

(71) Applicant: Virtual Instruments Corporation, San Jose, CA (US)

(72) Inventors: Ryan E. Perkowski, Middletown, DE (US); Sureshbabu Murugesan, Sunnyvale, CA (US); Vishal Neema, San Jose, CA (US); Rosanna Lee, Palo Alto, CA (US)

(73) Assignee: Virtual Instruments Corporation, San Jose, CA (US)

( * ) Notice: Subject to any disclaimer, the term of this patent is extended or adjusted under 35 U.S.C. 154(b) by 0 days.

(21) Appl. No.: 16/234,452

(22) Filed: Dec. 27, 2018

(65) Prior Publication Data
US 2019/0207841 A1 Jul. 4, 2019

Related U.S. Application Data

(60) Provisional application No. 62/611,892, filed on Dec. 29, 2017.

(51) Int. Cl.
*H04L 12/26* (2006.01)
*H04L 12/24* (2006.01)
(Continued)

(52) U.S. Cl.
CPC ........ *G06F 9/45558* (2013.01); *G06F 9/5077* (2013.01); *H04L 41/0233* (2013.01);
(Continued)

(58) Field of Classification Search
CPC ......... H04L 43/08; H04L 43/16; H04L 43/12; H04L 43/04; H04L 43/10; H04L 41/0233;
(Continued)

(56) References Cited

U.S. PATENT DOCUMENTS

| 7,185,192 | B1 * | 2/2007 | Kahn | G06F 21/6218 |
| | | | | 707/999.003 |
| 7,634,595 | B1 | 12/2009 | Brown | |

(Continued)

FOREIGN PATENT DOCUMENTS

EP   2262173   12/2010

OTHER PUBLICATIONS

International Application No. PCT/US2018/067760, International Search Report and Written Opinion dated Mar. 8, 2019.
(Continued)

*Primary Examiner* — Ruolei Zong
(74) *Attorney, Agent, or Firm* — Ahmann Kloke LLP

(57) ABSTRACT

A method comprising: receiving network traffic data from a network traffic monitoring platform, the network traffic data identifying communication between entities of an enterprise network and storage monitoring data from a server-based SAN monitoring platform, the storage monitoring data identifying communication between a software-only server-based SAN and entities of the enterprise network, parsing the received traffic data and storage monitoring data to identify object data and/or metric data, creating a metric table entry from metric data, creating an object table entry from object data linking metric table entries with object table entries, creating a link table entry from the linking of metric table entries with object table entries, for each link table entry, assigning an object performance threshold, comparing each metric table entries to the assigned object performance threshold, if an alarm trigger condition is satisfied based on the comparison, then triggering an alarm event and outputting an alarm notification.

19 Claims, 7 Drawing Sheets

(51) Int. Cl.
*G06F 9/455* (2018.01)
*G06F 9/50* (2006.01)
*H04L 12/851* (2013.01)
*H04L 29/08* (2006.01)

(52) U.S. Cl.
CPC ............ *H04L 41/06* (2013.01); *H04L 41/065* (2013.01); *H04L 41/0681* (2013.01); *H04L 41/0896* (2013.01); *H04L 41/145* (2013.01); *H04L 43/026* (2013.01); *H04L 43/0876* (2013.01); *H04L 43/12* (2013.01); *H04L 43/16* (2013.01); *H04L 47/2441* (2013.01); *H04L 47/2483* (2013.01); *H04L 67/1097* (2013.01); *G06F 2009/4557* (2013.01); *G06F 2009/45591* (2013.01); *G06F 2009/45595* (2013.01); *H04L 67/10* (2013.01)

(58) Field of Classification Search
CPC . H04L 41/06; H04L 41/14; G06F 2009/4557; G06F 2009/45591; G06F 2009/45595; G06F 9/45558; G06F 9/5077; G06F 11/3051; G06F 11/3055; G06F 11/3452
USPC ........................................................ 709/224
See application file for complete search history.

(56) References Cited

U.S. PATENT DOCUMENTS

| | | |
|---|---|---|
| 8,065,133 B1 | 11/2011 | Asbridge |
| 9,026,687 B1 | 5/2015 | Govande |
| 10,044,566 B1 | 8/2018 | Grisco |
| 10,216,812 B2 | 2/2019 | Witkop |
| 10,505,959 B1 | 12/2019 | Wang |
| 2002/0156883 A1 | 10/2002 | Natarajan |
| 2003/0167327 A1 | 9/2003 | Baldwin |
| 2005/0081208 A1 | 4/2005 | Gargya |
| 2005/0229182 A1 | 10/2005 | Grover |
| 2006/0184626 A1 | 8/2006 | Agapi |
| 2006/0242647 A1 | 10/2006 | Kimbrel |
| 2006/0271677 A1 | 11/2006 | Mercier |
| 2008/0019499 A1 | 1/2008 | Benfield |
| 2009/0016236 A1 | 1/2009 | Alcala |
| 2009/0106256 A1 | 4/2009 | Safari |
| 2009/0241113 A1 | 9/2009 | Seguin |
| 2009/0259749 A1 | 10/2009 | Barrett |
| 2009/0319580 A1 | 12/2009 | Lorenz |
| 2011/0225017 A1* | 9/2011 | Radhakrishnan ........................... G06Q 10/06315 705/7.25 |
| 2012/0030352 A1 | 2/2012 | Sauma Vargas |
| 2012/0044811 A1 | 2/2012 | White |
| 2012/0131593 A1 | 5/2012 | DePetro |
| 2012/0192197 A1 | 7/2012 | Doyle |
| 2013/0060932 A1 | 3/2013 | Ofek |
| 2013/0117847 A1 | 5/2013 | Friedman |
| 2013/0152200 A1 | 6/2013 | Alme |
| 2014/0112187 A1 | 4/2014 | Kang |
| 2014/0331277 A1 | 11/2014 | Frascadore |
| 2015/0074251 A1 | 3/2015 | Tameshige |
| 2016/0004475 A1* | 1/2016 | Beniyama ............. G06F 3/0611 710/74 |
| 2016/0044035 A1 | 2/2016 | Huang |
| 2016/0119234 A1 | 4/2016 | Valencia Lopez |
| 2016/0359897 A1 | 12/2016 | Yadav |
| 2017/0123849 A1 | 5/2017 | Tian |
| 2017/0168866 A1* | 6/2017 | Kong .................. G06F 9/45533 |
| 2017/0317899 A1 | 11/2017 | Taylor |
| 2018/0115585 A1 | 4/2018 | Rubakha |
| 2018/0165451 A1 | 6/2018 | Kawakita |
| 2018/0324045 A1 | 11/2018 | Grisco |
| 2019/0065230 A1 | 2/2019 | Tsirkin |
| 2019/0089617 A1 | 3/2019 | Raney |
| 2019/0163589 A1 | 5/2019 | McBride |
| 2019/0243671 A1 | 8/2019 | Yadav |

OTHER PUBLICATIONS

International Application No. PCT/US2019/058976, Search Report and Written Opinion dated Mar. 25, 2020.
International Application No. PCT/US2019/059282, Search Report and Written Opinion dated Apr. 7, 2020.
Androulidakis, G. et al., "Improving Network Anomaly Detection via Selective Flow-Based Sampling," IET Communications, vol. 2, No. 3, pp. 399-409, Mar. 2008.
Cejka, Tomas et al., "NEMEA: A Framework for Network Traffic Analysis," Proceedings of the 12th Conference on Network and Service Management (CNSM 2016), pp. 195-201, Nov. 2016.
Chandramouli, Ramaswamy, "Security Assurance Requirements for Hypervisor Deployment Features," Seventh International Conference on Digital Society, Feb. 2013.
Kind, Andreas et al., "Histogram-Based Traffic Anomaly Detection," IEEE Transactions on Network Service Management, vol. 6, No. 2, pp. 110-121, Jun. 2009.
Ramamoorthy, S. et al. "A Preventive Method for Host Level Security in Cloud Infrastructure," Proceedings of the 3rd International Symposium on Big Data and Cloud Computing Challenges, Feb. 2016.
Sethi, Chhabi et al., "Trusted-Cloud: A Cloud Security Model for Infrastructure as a Service (IaaS)," International Journal of Advanced Research in Computer Science and Software Engineering, vol. 6, No. 3, Mar. 2016.
Urias, Vincent E et al., "Hypervisor Assisted Forensics and Incident Response in the Cloud," 2016 IEEE International Conference on Computer and Information Technology, Dec. 2016.
Wang, Wei et al., "Network Traffic Monitoring, Analysis and Anomaly Detection," Guest Editorial, IEEE Network, pp. 6-7, May 2011.

* cited by examiner

SYSTEM AND METHOD OF CROSS-SILO DISCOVERY AND MAPPING OF STORAGE, HYPERVISORS AND OTHER NETWORK OBJECTS

CROSS-REFERENCE TO RELATED APPLICATIONS

The present application claims benefit of U.S. Provisional Patent Application Ser. No. 62/611,892, filed Dec. 29, 2017 and entitled "Systems and Methods for Performance Management of Data Infrastructure," which is incorporated by reference herein. In addition, the following applications filed on Dec. 27, 2018 are incorporated by reference herein: U.S. Nonprovisional patent application Ser. No. 16/234,353 entitled "System and Method of Application Discovery," U.S. Nonprovisional patent application Ser. No. 16/234,384 entitled "Systems and Methods of Application Aware Improvement of Storage Network Traffic," U.S. Nonprovisional patent application Ser. No. 16/234,402 entitled "System and Method of Flow Source Discovery," U.S. Nonprovisional patent application Ser. No. 16/234,424 entitled "System and Method of Dynamically Assigning Device Tiers Based on Application," and U. S. Nonprovisional patent application Ser. No. 16/234,440 entitled "Systems and Methods of Discovering and Traversing Coexisting Topologies."

BACKGROUND

Complexity of enterprise networks has increased to a point where even information technology (IT) administrators may not be aware of the computing and storage resources on which mission-critical applications of the organization are running on.

Enterprise networks consist of computing and storage resources designed to run business-related applications of an organization. Applications of the enterprise network, include for example email service, web service, database, customer relationship management (CRM), data file, virtual desktop infrastructure (VDI), enterprise resource planning (ERP), and the like.

Enterprise networks are increasingly moving towards a combination of on-premise and cloud-based infrastructure, making the ability to determine computing and storage resources associated with business-related application more difficult.

Corporations demands acceptable levels of performance, reliability, redundancy, and security from its computing and storage devices. One way to achieve performance, reliability, and redundancy is to provide more resources than the computing environment would ever need. Unfortunately, the cost of information technology equipment, software and personnel can be prohibitively expensive, and runs contrary to an overall goal of an enterprise of profitability. Every corporation must strike a balance between their cost of additional computing and storage versus performance, reliability and redundancy benefits of the additional computing and storage resources.

One way for IT administrators to monitor aspects of the increasingly complex enterprise network is with assistance from a wide variety of standalone and integrated software tools available to aid in the monitoring various aspects of the enterprise network. These tools include standalone software such as an IT management software, an application performance software, and software to create a software-only server-based storage area network. For example, software-defined storage products that allows enterprises to create a software-only server-based storage area network (SAN) from local application server using existing storage devices. These software-defined storage products have the capability to convert direct attached storage (DAS) into shared block storage, and may be installed in existing storage devices and may be integrated into storage devices produced by certain manufacturers. However, each of the standalone or integrated software may capture data regarding different aspects of the enterprise network. For example, software to manage IP network traffic may provide data such as the speed of each hop from the router to a host, but would not capture data regarding attributes of the host such as the operating system running on the host, or CPU usage of the host. Furthermore, data provided by different standalone or integrated software may be viewed on their own platform, and may be isolated from one another, making it difficult to monitor the performance, health and capacity of entities of the enterprise network. The entities of the enterprise network includes applications, storage arrays, virtual machines and the like.

In one example involving the difficulty of identifying the root of a problem, a user of the enterprise network complains of slow response of the virtual desktop application of the enterprise network. The IT administrator may run a diagnostic, using storage performance monitoring tools, on one or more storage resources on which the VDI application is known to be running. The storage performance monitoring tool may determine that no storage performance problem exists. A common solution to the issue may be to increase the storage array capacity of the enterprise network, which may not result in an improvement in response time of the storage array. The software integrated in routers of the enterprise network may not be able to pin point reasons for the slow response of the VDI application, since this software would only have access data regarding traffic on the routers, and not the performance of other entities of the VDI application connected to the routers.

SUMMARY

An example system may comprise one or more processors. The memory containing instructions to control the one or more processors to control the one or more processors to: receive from a plurality of probes: network traffic data from a network traffic monitoring platform, the network traffic monitoring platform being in communication with an enterprise network, the network traffic data identifying communication between entities of the enterprise network, and storage monitoring data from a server-based SAN monitoring platform, the server-based SAN monitoring platform being in communication with the enterprise network, the storage monitoring data identifying communication between a software-only server-based SAN and entities of the enterprise network, parse the received traffic data to identify at least one of a plurality of object data and/or at least one of a plurality of metric data, parse the received storage monitoring data to identify at least one of the plurality of object data and/or at least one of the plurality of metric data, create a metric table entry from the at least one identified metric data of the enterprise network, the metric data including properties of the enterprise network and a metric unique identifier, create an object table entry from the at least one identified object data of the enterprise network, the object data identifying an object of the enterprise network and an object unique identifier, and properties of the object of the enterprise network, the object of the enterprise network including an application of the enterprise network, a host of the enterprise network, link one of a plurality of metric table entries with at least one of a plurality of object table entries, the linking of the one of the plurality of metric table entries with the at least one of the plurality of object tables entries done by comparing the metric unique identifier to the object unique identifier, create a link table entry from the linking of one of the plurality of metric table entries with the at least one of the plurality of object table entries, for each of a plurality of link table entries: assign an object performance threshold to each of the plurality of metric table entries linked to that link table entry based the property of the enterprise network, compare the object performance threshold to each of the plurality of metric table entries to the assigned object performance threshold, and if an alarm trigger condition is satisfied based on the comparison, then trigger an alarm event, and output an alarm notification, the alarm notification based on the alarm event, the alarm notification identifying the object data of the enterprise network and the assigned object performance threshold.

In various embodiments, the object performance threshold is based at least on a type of object of the enterprise network. In one embodiment, the object performance threshold is a tiered object performance threshold. In some embodiments, the plurality of probes further receive application data, the application data including: a plurality of application identifiers, the application identifier identifying at least one of a plurality of application instances of the enterprise network, a tier of service of that particular application instance, and a mapping of each of the plurality of application instances to objects of the enterprise network, wherein the tier of service for each of the plurality of application instances are retrieved from an IT management software. In one embodiment, the application data is received from an application discovery system. In some embodiments, the application data is received from a user of the enterprise system. In various embodiments, the object performance threshold is based at least on the tier of service of object of the enterprise network, wherein the object performance threshold is configured by a user of the enterprise network. In one embodiment, the properties of the object of the enterprise network further including the application identifier and the tier of service associated with the application instance.

An example method comprises receiving from a plurality of probes: network traffic data from a network traffic monitoring platform, the network traffic monitoring platform being in communication with an enterprise network, the network traffic data identifying communication between entities of the enterprise network, and storage monitoring data from a server-based SAN monitoring platform, the server-based SAN monitoring platform being in communication with the enterprise network, the storage monitoring data identifying communication between a software-only server-based SAN and entities of the enterprise network, parsing the received traffic data to identify at least one of a plurality of object data and/or at least one of a plurality of metric data, parsing the received storage monitoring data to identify at least one of the plurality of object data and/or at least one of the plurality of metric data, creating a metric table entry from the at least one identified metric data of the enterprise network, the metric data including properties of the enterprise network and a metric unique identifier, creating an object table entry from the at least one identified object data of the enterprise network, the object data identifying an object of the enterprise network and an object unique identifier, and properties of the object of the enterprise network, the object of the enterprise network including an application of the enterprise network, a host of the enterprise network, linking one of a plurality of metric table entries with at least one of a plurality of object table entries, the linking of the one of the plurality of metric table entries with the at least one of the plurality of object tables entries done by comparing the metric unique identifier to the object unique identifier, creating a link table entry from the linking of one of the plurality of metric table entries with the at least one of the plurality of object table entries, for each of a plurality of link table entries: assigning an object performance threshold to each of the plurality of metric table entries linked to that link table entry based the property of the enterprise network, comparing the object performance threshold to each of the plurality of metric table entries to the assigned object performance threshold, and if an alarm trigger condition is satisfied based on the comparison, then triggering an alarm event, and outputting an alarm notification, the alarm notification based on the alarm event, the alarm notification identifying the object data of the enterprise network and the assigned object performance threshold.

An example computer program product comprising a computer readable storage medium having program code embodied therewith, the program code executable by a computing system to cause the computing system to perform, receiving from a plurality of probes: network traffic data from a network traffic monitoring platform, the network traffic monitoring platform being in communication with an enterprise network, the network traffic data identifying communication between entities of the enterprise network, and storage monitoring data from a server-based SAN monitoring platform, the server-based SAN monitoring platform being in communication with the enterprise network, the storage monitoring data identifying communication between a software-only server-based SAN and entities of the enterprise network, parsing the received traffic data to identify at least one of a plurality of object data and/or at least one of a plurality of metric data, parsing the received storage monitoring data to identify at least one of the plurality of object data and/or at least one of the plurality of metric data, creating a metric table entry from the at least one identified metric data of the enterprise network, the metric data including properties of the enterprise network and a metric unique identifier, creating an object table entry from the at least one identified object data of the enterprise network, the object data identifying an object of the enterprise network and an object unique identifier, and properties of the object of the enterprise network, the object of the enterprise network including an application of the enterprise network, a host of the enterprise network, linking one of a plurality of metric table entries with at least one of a plurality of object table entries, the linking of the one of the plurality of metric table entries with the at least one of the plurality of object tables entries done by comparing the metric unique identifier to the object unique identifier, creating a link table entry from the linking of one of the plurality of metric table entries with the at least one of the plurality of object table entries, for each of a plurality of link table entries: assigning an object performance threshold to each of the plurality of metric table entries linked to that link table entry based the property of the enterprise network, comparing the object performance threshold to each of the plurality of metric table entries to the assigned object performance threshold, and if an alarm trigger condition is satisfied based on the comparison, then triggering an alarm event, and outputting an alarm notification, the alarm notification based on the alarm event, the alarm notification identifying the object data of the enterprise network and the assigned object performance threshold.

DETAILED DESCRIPTION

Various embodiments enable customers to deliver on complex requirements of their application infrastructure. Systems discussed herein may provide insights into the performance and availability of the end-to-end system—across physical, virtual and cloud environments. The system may intelligently capture, correlate, and/or analyze both breadth and depth of data, transforming data regarding an assets/applications of an enterprise network into answers and actionable insights.

A cross-silo discovery system may be used to give IT administrator an awareness of network objects of the enterprise network. Network objects include physical and virtual objects of the network which communicate with each other by receiving, sending, and transmitting data. The cross-silo discovery system may obtain real-time views of the performance, health and capacity of a software-only server-based SAN by correlating data from different sources to provide a real-time comprehensive view of network objects of the enterprise network from different aspects. The cross-silo discovery system may provide a real-time comprehensive view of network objects of the enterprise network by monitoring the behavior of network objects.

The cross-silo discovery system may collect and analyze network traffic data to identify and monitor network objects. In some embodiments, the cross-silo discovery system may provide links between the network traffic data and the monitored network objects. Network objects or entities of the enterprise network may include, but are not limited to, virtual machines (VMs), hosts, applications, servers, routers, switches, and storage devices. The links between the network traffic data and the monitored network objects may be compared to an assigned object performance threshold. If an alarm trigger condition is satisfied based on a comparison of network traffic data and the assigned object performance threshold, an alarm event may be triggered. The cross-silo discovery system may output an alarm notification based on the alarm event. The alarm notification may identify properties or attributes of the alarm such as a severity of the alarm, the name of the alarm, and the object performance threshold that was exceeded. In some embodiments, the alarm notification may include a templatized remediation.

The templatized remediation may include a change that may be made to a network object that may resolve the alarm that has been proven to work in the past.

The cross-silo discovery system may determine the health, utilization, and performance data for storage controllers, ports and volumes of software-only server-based SAN arrays. In some embodiments, the cross-silo discovery system provides real-time visibility into the performance, health and utilization of applications across physical, virtual, and cloud computing environments.

Figure 1:
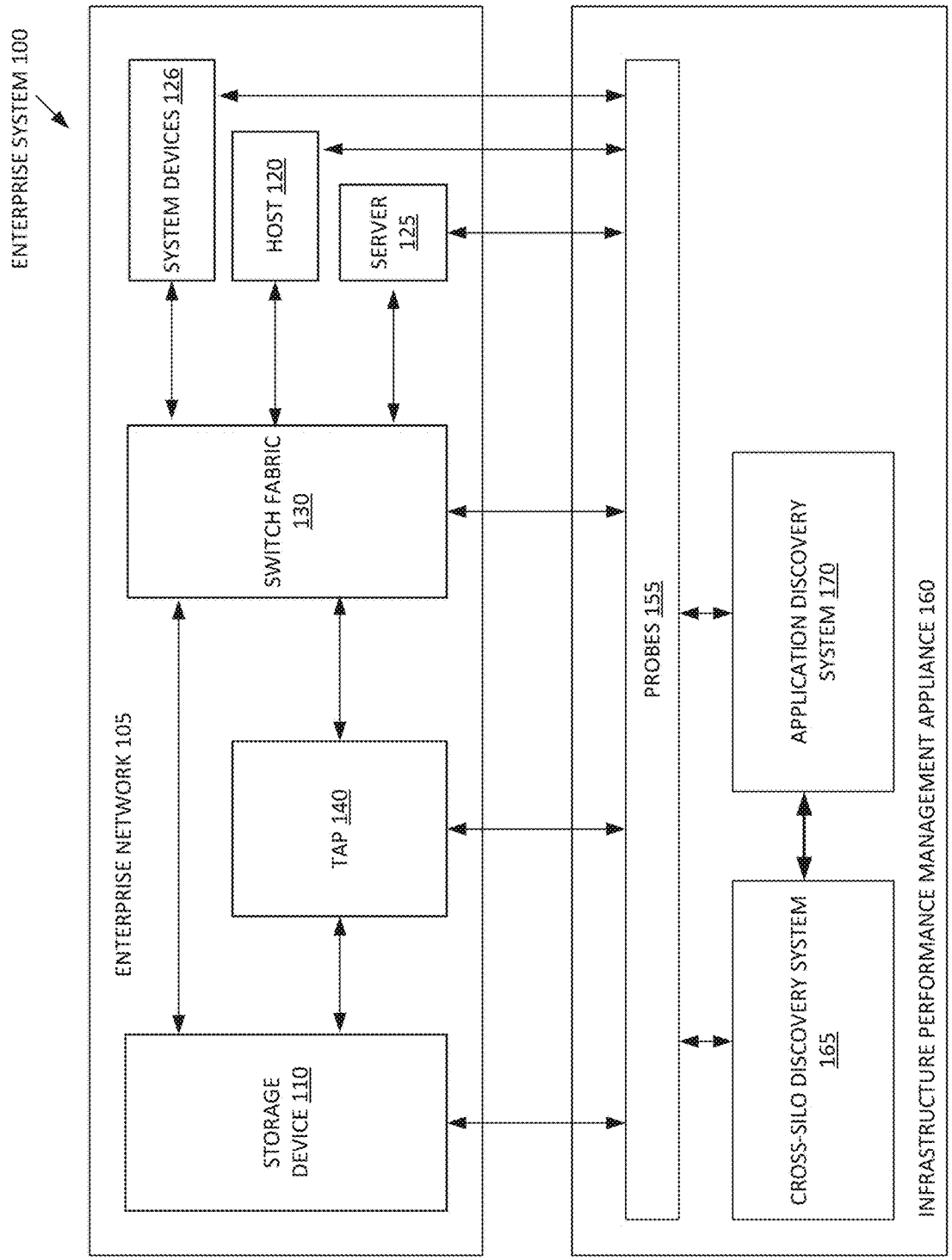
FIG. 1 depicts a block diagram of an enterprise system capable of providing cross-silo discovery and mapping of storage, hypervisor and other network objects according to some embodiments.

FIG. 1 depicts a block diagram of an enterprise system 100 capable of providing cross-silo discovery and mapping of storage, hypervisor and other network objects. The enterprise system may include an enterprise network 105 and an infrastructure performance management appliance 160. The enterprise network 105 includes a storage device 110, a host 120, a server 125, system devices 126, a switch fabric 130, and a traffic access point (TAP) 140. The infrastructure performance management appliance 160 includes probes 155, a cross-silo discovery system 165 and an application discovery system 170.

The storage devices 110 of the enterprise system 100 include one or more storage system(s) that stores data. In one embodiment, the storage devices 110 includes a disk array. In some embodiments, a storage device includes a storage array network (SAN). In various embodiments, the storage device is cloud storage.

The host 120 of the enterprise system 100 may include a physical computer or server which send or receive data, services, or applications. Hosts may be also connected to other computers or servers via a network. In some examples, the host 120 may be an instance of an operating system. For example, the hosts 120 may include instances of UNIX, Red Hat, Linux and others. In some embodiments, the hosts 120 may include a physical computer managed by Microsoft Windows. Hosts 120 may include one or more virtual machines.

Server 125 may include computer software or hardware used to store manage network connections and store data. In some embodiments, the server 125 may be a physical computer or virtual machine which provides data to other computers.

System devices 126 may include entities of the enterprise network 105 such as third-party software platforms subscribed to by the enterprise network 105. In various embodiments, the third-party software platform includes IT management software such as ServiceNow or an application performance integration platform such as AppDynamics. ServiceNow or AppDynamics may provide an application to virtual machine mapping to the cross-silo discovery system. The application to virtual machine mapping may aid the cross-silo discovery system in providing a real time application to host mapping.

The switch fabric 130 may use packet switching to receive, process, and forward data from a source device to a destination device. The switch fabric 130 may include any number of switches, such as routers, bridges, or the like. The switch fabric 130 may provide communication between any two entities of the enterprise system 100 such as the storage device 110, the host 120, the server 125, system devices 126, the switch fabric 130, and the TAP 140 and the infrastructure performance management appliance 160.

The TAP 140 may include an optical splitter which provides a copy of data passing through a fiber optic channel without affecting the integrity of the data. The fiber optic channel may connect the storage devices 110 to the server 125. The copy of data may be used for real-time performance monitoring of data traffic travelling through the fiber optic channel. The TAP 140 may provide connectivity to links between storage ports of the storage device 110 and switches of switch fabric 130. In various embodiments, the TAP 140 may provide connectivity on both sides of fabric based storage virtualizers such as cloud-based storage.

In some embodiments, the probes 155 include network switch probes and/or a hardware or software probe to monitor software-only server-based SAN. The network switch probe may be an agentless software that utilizes one or more application programming interfaces (APIs) to gather switch performance and link error statistics from the switch fabric 130. The network switch probe may utilize Storage Management Initiative Specification (SMI-S) which is a standard intended to facilitate the management of storage devices from some SAN vendors. The network switch probe may discover and present to cross-silo discovery system 165 or the application discovery system 170, entities of the enterprise network 105 to aid in building a topology. The entities of the enterprise network 105 may include physical fabric, logical fabric, physical switches, logical switches, blades and switch ports. In some embodiments, the probes 155 may receive application data from the application discovery system 170.

The software-only server-based SAN monitored by the software probe may be a hyper-converged or converged environment. In some embodiments, the software-only server-based SAN is Dell EMC ScaleIO, or ScaleIO. ScaleIO is a product that converges storage and compute resources to form a single-layer. For example, ScaleIO may be used in an enterprise network to use existing local disks and local area networks (LANs) and convert them into a shared block storage. ScaleIO may comprise any or all of the following software components: Meta Data Manager (MDM), ScaleIO Data Server (SDS), and ScaleIO Data Client (SDC). The Meta Data Manager configures and monitors the ScaleIO system. The ScaleIO Data Server manages the capacity of a single server and acts as a back-end for data access. An instance of ScaleIO Data Server may be installed on all servers contributing to the software-only server-based SAN. The ScaleIO Data Client is a device driver, an instance of the ScaleIO Data Client may be installed in each client device whose applications or file system requires access to the ScaleIO SAN.

The software probes may receive storage monitoring data. The storage monitoring data may include metrics such as system primary read throughput, system total read input output per second (IOPS), device total read throughput, device total write throughput, storage read latency, storage write latency, and the like. The storage monitoring data may represent entities of the software-only server-based SAN such as ScaleIO devices, local disks, ScaleIO servers, and ScaleIO network interfaces.

In some embodiments, the cross-silo discovery system 165 sends a request to the probes 155 to receive network traffic data from the network switch probes. The network traffic data includes at least one of a source entity of the enterprise network, a destination entity of the enterprise network, and metrics of the network traffic. The metrics of the network traffic data includes at least one of a type of flow source, read speed total byte count, incoming byte count, outgoing byte count, incoming bit rate, outgoing bit rate, and total packet rate.

In some embodiments, the network traffic data may be in the form of flow packets. Each flow packet includes any number of flow records, a template record, and a packet header. Any number of flow records may provide information associated with each flow. In various embodiments, the data packet includes one or more template identifiers. Each of the flow records may be generated by one of any number of flow sources in a data path.

The cross-silo discovery system 165 may parse the received network traffic data into object data and metrics data. Object data, as the name implies, represents an object of the enterprise network, and may include an internet protocol (IP) address and attributes of the network object. In some embodiments, network objects of the enterprise network 105 include entities of the enterprise network 105, such as the host 120, an entity of the switch fabric, the storage device 110, and the server 125. In various embodiments, network object may represent an application instance of the enterprise network 105. Metric data includes metrics of a network object. In some embodiments, metric data includes measurable time-varying attributes of the network object.

For example, the object data associated with an entity of the switch fabric 130, such as a router may include the IP address of the router, the manufacturer of the router, such as Cisco, and the version of the traffic monitoring software integrated into the router. Metrics data associated with the router may include read speed total byte count, incoming byte count, outgoing byte count, incoming bit rate, outgoing bit rate, and total packet rate.

In some embodiments, the cross-silo discovery system 165 send a request to the probes 155 to receive storage monitoring data. Object data includes an IP address and attributes of the network object. Different types of network objects may have different attributes. For example, a ScaleIO device may have attributes such as the capacity of the ScaleIO device.

In some embodiments, the cross-silo discovery system 165 sends a request to the probes 155 to receive storage monitoring data from the software probes. The storage monitoring data includes an IP address of a ScaleIO storage device, communication exchange between an entity of the software-only server-based SAN and an entity of the enterprise network, and communication exchange between the entity of the software-only server-based SAN and a network object. The metrics of the storage monitoring data include average read latency, average write latency, primary read from device IOPS, and primary write IOPS, user data read IOPS, user data write IOPS, number of ScaleIO devices, total read throughput, and total write throughput.

In one embodiment, the cross-silo discovery system 165 mays store the storage monitoring data for a predetermined period of time. The predetermined period of time may depend on many factors including, but not limited to a tier of service associated with storage monitoring data and the amount of storage available in the enterprise network.

The cross-silo discovery system 165 may create or update an object entry based on the parsed object data. A newly created or updated object entry may be updated to an object table. Each object entry may represent one network object of the enterprise network 105.

The cross-silo discovery system 165 may create or update a metric entry based on the parsed metric data. A newly created or an updated metric entry may be updated to a metric table. Each metric entry may represent one metric associated with one network object of the enterprise network 105. One object entry may be associated with multiple metric entries. Each metric may be associated with multiple object entries.

The cross-silo discovery system 165 may link one object entry with another object entry, one object entry with one or more metric entries, and/or one metric entry with multiple object entries. The cross-silo discovery system 165 may link one entry with another, in one of the example combinations listed above, by comparing a unique identifier which may be found in both entries.

For example, the cross-silo discovery system 165 may receive storage monitoring data, parse the received storage monitoring data, and identify a ScaleIO device. The cross-silo discovery system 165 may create an object entry based on the identified ScaleIO device. The object entry of the ScaleIO device may include a capacity of the ScaleIO device and a unique identifier. In some embodiments, the unique identifier is an IP address. The cross-silo discovery system 165 may receive network traffic data, parse the received network traffic data, and identify a communication between two network objects of the enterprise network. The received network traffic data may include an IP address associated with the source entity of the enterprise network 105 (source IP address), an IP address associated with the destination entity of the enterprise network 105 (destination IP address), and metrics of the communication. The cross-silo discovery system 165 may create two object entries based on the source IP address and destination IP address. However, when the cross-silo discovery system 165 stores the two object entries into the datastore, the datastore may determine that the object entry associated with the source IP address already exists since it is the same as the ScaleIO device already identified by the storage monitoring data. The cross-silo discovery system 165 may create at least one metric entry based on the metrics of the communication such as average read latency of the ScaleIO device. The metric entry may include the average read latency of the ScaleIO device and the IP address associated with the ScaleIO device. As the average read latency of the ScaleIO device changes, the metric entry is updated.

The cross-silo discovery system 165 may create or update a link entry based on the linking of two entries of the enterprise network 105. In some embodiments, the link entry may link: two object entries together or one metric entry with one object entry. In various embodiments, the link entry may contain an alarm field, the alarm field identifying one or more rules of the rules datastore 222 which the link entry is subject to. Each rule which the link entry is subject to may include an object performance threshold. The object performance threshold identifies a threshold of a metric associated with a particular network object.

For link entries which link one object entry with one metric entry, the cross-silo discovery system 165 may determine one or more rules to apply to the metric associated with the link entry. Using the above example of the ScaleIO device and the average read latency, the cross-silo discovery system 165 may assign an object performance threshold to that particular link entry. As the average read latency for the ScaleIO device changes, the associated metric entry may change. The cross-silo discovery system 165 may compare the object performance threshold with a particular metric entry associated with the average read latency for the ScaleIO device. The cross-silo discovery system 165 may trigger an alarm event if an alarm condition is satisfied. The alarm condition may be satisfied when the particular metric entry for the ScaleIO device is greater than the object performance threshold for the average read latency. In which case, the alarm notification may be provided to the IT administrator or other user of the enterprise network 105.

In addition to network traffic data, the cross-silo discovery system 165 may receive a list of applications from any number of sources. In one embodiment, the cross-silo discovery system 165 may receive the list of applications or the subset of the list of applications from an application discovery system 170 which may be a part of the infrastructure performance management appliance 160. The list of applications may include application data. In this example, the application data may include application identifiers which identifies at least one application instance of the enterprise network. The application data may also include attributes of the application such as a tier of service of the application, a name of the application, and entities of the enterprise network which make up the application. In some embodiments, the application data includes application metrics such as application read response time and application write response time.

The tier of service may be used to prioritize one application or group of applications over another. The tier of service may also be used to group similar service levels which may correspond to critical levels of applications. In one example, the enterprise network may comprise four tiers, with the most important and business critical tier named "tier 0", followed by, in order of decreasing importance, "tier 1," "tier 2", and "tier 3." The tier of service of an application propagates to the entities associated with the application. When an entity is a member of a tier, it becomes subject to SLA alarms and tiered alarm thresholds associated with the tier.

In some embodiments, the object performance threshold may be a tiered object performance threshold. The cross-silo discovery system 165 may receive application data, the application data may include application identifiers, a tier of service and a mapping of entities of the enterprise network 105 for the application. Entities of the enterprise network 105 associated with an application may be assigned the tier of service of that particular application instance. The object performance threshold may be based on the tier of service of the application instance associated with a particular entity of enterprise network 105.

In some embodiments, the cross-silo discovery system 165 may receive the list of applications from the application discovery system 170. The process of application discovery may include the application discovery system 170 implementing secure shell (SSH), or windows management instrumentation (WMI) to communicate with entities of the enterprise network 105. The application discovery system may take information received from SSH and WMI protocols, and apply heuristics to suggest from heuristic implications what applications could exist. For example, the application discovery system 170 may determine that entities of the enterprise network 105 which communication with each other at regular intervals throughout the day and were introduced to the enterprise network 105 at around the same time may be a part of the same application.

In some embodiments, the process of application discovery includes integrating information from software platforms which manages or monitors the performance of applications on the enterprise network 105. For example, application discovery system 170 may take information regarding applications discovered by ServiceNow along with information from SSH or WMI to obtain a more accurate topology of entities involved in applications of the enterprise network 105. The enterprise may choose to subscribe software platforms such as ServiceNow and AppDynamics to monitor entities of the enterprise network 105 known to be associated with business critical applications.

In some embodiments, the application discovery system 170 identifies entities of an enterprise network, integrates data from software platforms already subscribed by the enterprise network 105, and retrieves data from probes to monitor various entities of the enterprise network. In some embodiments, the probes are hardware probes, software probes, or a combination of the two. In various embodiments, the probes are plug-ins that come built in with various network monitoring platforms. In some embodiments, a probe may include an optical splitter which provides a copy of data passing through a fiber optic channel of the enterprise network 105 without affecting the integrity of the data. The fiber optic channel connecting storage devices with servers of the enterprise network. The copy may be used for real time performance monitoring of the traffic travelling through the fiber optic channel. The information obtained from the probes may suggest from heuristic implications that applications could exist on the enterprise network 105.

It will be appreciated that platforms such as ServiceNow and AppDynamics may not be able to discover applications running on entities of the enterprise network 105 which are not monitored by those platforms. Furthermore, ServiceNow, AppDynamics and the like may not be able to recognize an entity added to an application subsequent to the discovery of the application by ServiceNow, unless the enterprise subscribes the added entity of the enterprise network 105. In addition, ServiceNow may not be able to recognize applications running on entities not subscribed to ServiceNow which has an effect on a business critical application. For example, a host of enterprise network 105 which is not subscribed to ServiceNow may be in communication with a server that is part of a business critical application, such as web server. The host may be running an out-of-date version of a long forgotten application and is in constant communication with the server of web server and taking up the utilization of an entity of a business critical application. The use of application discovery on entities of the enterprise network 105, regardless of whether or not the entity is subscribed to ServiceNow, AppDynamics or other software platforms which manages or monitors the performance of applications on the enterprise network 105, may aid in discovering inefficient software and hardware components of the enterprise network 105 and obtain a better understanding of where applications live on the infrastructure of the network and model and monitor application behavior and their effect on infrastructure resources.

In some embodiments, the application discovery system 170 may update or modify a set of applications discovered by the IT management or application performance software platforms. For example, ServiceNow may determine that an email service of the enterprise includes eight entities communicating with each other in a particular configuration. The application discovery system 170 may create and store a discovered application entry which includes attributes (e.g., metrics) of the discovered application such as a suggested name of the discovered application as well as attributes associated with the eight entities which make up the discovered application. Through SSH or WMI commands on the entities of the enterprise network 105, heuristic implications of the application discovery system 170 may suggest or otherwise indicate that the enterprise network 105 includes an email service comprising nine entities with eight of the nine entities communications in the same configuration as the configuration from the email service discovered by ServiceNow. The ninth entity may not be subscribed to by ServiceNow, or the ninth entity may have been added to the enterprise network 105 after the IT management or application performance software platform was introduced to the enterprise network 105. In some embodiments, the application discovery system 170 may create a discovered application entry which includes attributes associated with the nine entities which make up the discovered application and over write the previous discovered application entry of the email service with eight entities in the datastore of the application discovery system 170.

In various embodiments, the application discovery system 170 does not overwrite the second discovered application entry for the email service with nine entities, but reports both discovered application entries, and have a system or network professional decide which discovered application entry is correct, or the one to keep. In some instances, the application discovery system 170 may send a request to ServiceNow to update the attributes associated with the application as well as the entities associated with the application.

The process of discovering applications can be time consuming and take up enterprise network resources and cause users on the enterprise network to experience slow response time. For example, if enterprise network 105 comprised 100,000 entities, the SSH or WMI component of the application discovery process may involve the SSH or WMI command between the application discovery system 170 and the 100,000 entities. It may be advantageous to schedule application discovery to a time frame when the servers and other entities of the enterprise network are not experiencing a high level of utilization or when critical functions are not impacted (or impacted marginally).

In one example, an IT administrator may schedule an application discovery process to take place during particular times of the day or week. The application discovery process may be paused. The application discovery system 170 may bookmark the last discovered application or the last piece of data received from SSH or WMI command. When the application discovery process resumes, the application discovery system 170 may resume the process at the bookmarked state. In another example, the application discovery system 170 may determine that an application discovery process can commence on an entity of the enterprise network, such as a server, if an entity utilization less than an entity utilization threshold.

The application discovery system 170 may determine that the application discovery process of an entity of the enterprise network 105 is suspended when the entity utilization is greater than the entity utilization threshold. In some embodiments, the entity utilization threshold which triggers the commencement of the application discovery process and the entity utilization threshold which triggers the suspension of the application discovery process are different.

In some embodiments, the application discovery process is complete, or is suspended when one of a plurality of trigger conditions is satisfied. Trigger conditions may include a scheduled discovery period has passed, the application discovery system 170 receives input from the user of the enterprise network 105 to commence or suspend the application discovery process, or the utilization threshold of one or more entities of the enterprise network 105 is reached.

The application discovery system 170 may receive information from a subset or all of the entities of the enterprise network for a predetermined period of time. The predetermined period of time may be determined by a user of the enterprise network 105 such as the IT administrator or authorized device of the enterprise network 105. The IT administrator or authorized device of the enterprise network 105 may schedule the application discovery process and determine the start, end and duration of the application discovery process. In various embodiments, the subset of the entities of the enterprise network is determined by the IT administrator, authorized device of the enterprise network 105, or by the application discovery system 170.

The application discovery system 170 may receive input from the user of the enterprise network 105 to commence or suspend the application discovery process. In some embodiments, the application discovery system 170 discover applications on the enterprise network 105. The IT administrator of the enterprise network 105 may schedule an application discovery process to occur during specified times of the day and/or during particular days of the week. The application discovery system 170 may receive a request for an initial application discovery of the enterprise network 105. This request may occur after the application discovery system 170 is first installed into the enterprise network 105 and may occur on command and/or at specified times/dates.

Once initiated, the initial application discovery process may continue until it is completed or paused. The application discovery system 170 may run subsequent analysis according to the schedule inputted by the IT administrator or authorized device of the enterprise network 105. Application discovery processes subsequent to the initial application discovery may involve the same steps, however, an initial application discovery process may require more time to complete since subsequent application discovery process may ignore applications which have been previously discovered.

In some embodiments, the application discovery system 170 discovers that a particular application has not changed in the last predetermined number of iterations (e.g., ten) of the application discovery process. In such a case, the application discovery system 170 may choose to identify the application periodically. As such, the application discovery system 170 may skip analysis or determination of previously discovered applications that rarely change.

In various embodiments, the number of iterations which triggers the periodic discovery of an application, such as ten in the above example, may change according to attributes (e.g., metrics) of the particular application, such as tier or criticality of the particular application. For example, a more critical application may require discovery or identification during every iteration of the application discovery process, to ensure that entities associated with the critical application are monitored, while a less critical application may not require discovery during every iteration of the application discovery process.

In one embodiment, once initiated, the application discovery system 170 may suspend the initial application discovery process when a scheduled application discovery time frame has elapsed. The application discovery process may be suspended until a subsequent scheduled application discovery time frame has begun. In some embodiments, the initial application discovery process is suspended when the entity utilization of one or more (e.g., a predetermined number of) entities of the enterprise network is greater than an entity utilization threshold. In various embodiments, the initial discovery process is suspended when the application discovery system 170 receives an input from the IT administrator or authorized device of the enterprise network 105 to suspend the application discovery process.

In some embodiments, the cross-silo discovery system 165 may receive network data from virtual machine data probes integrated within the enterprise network 105.

Figure 2:
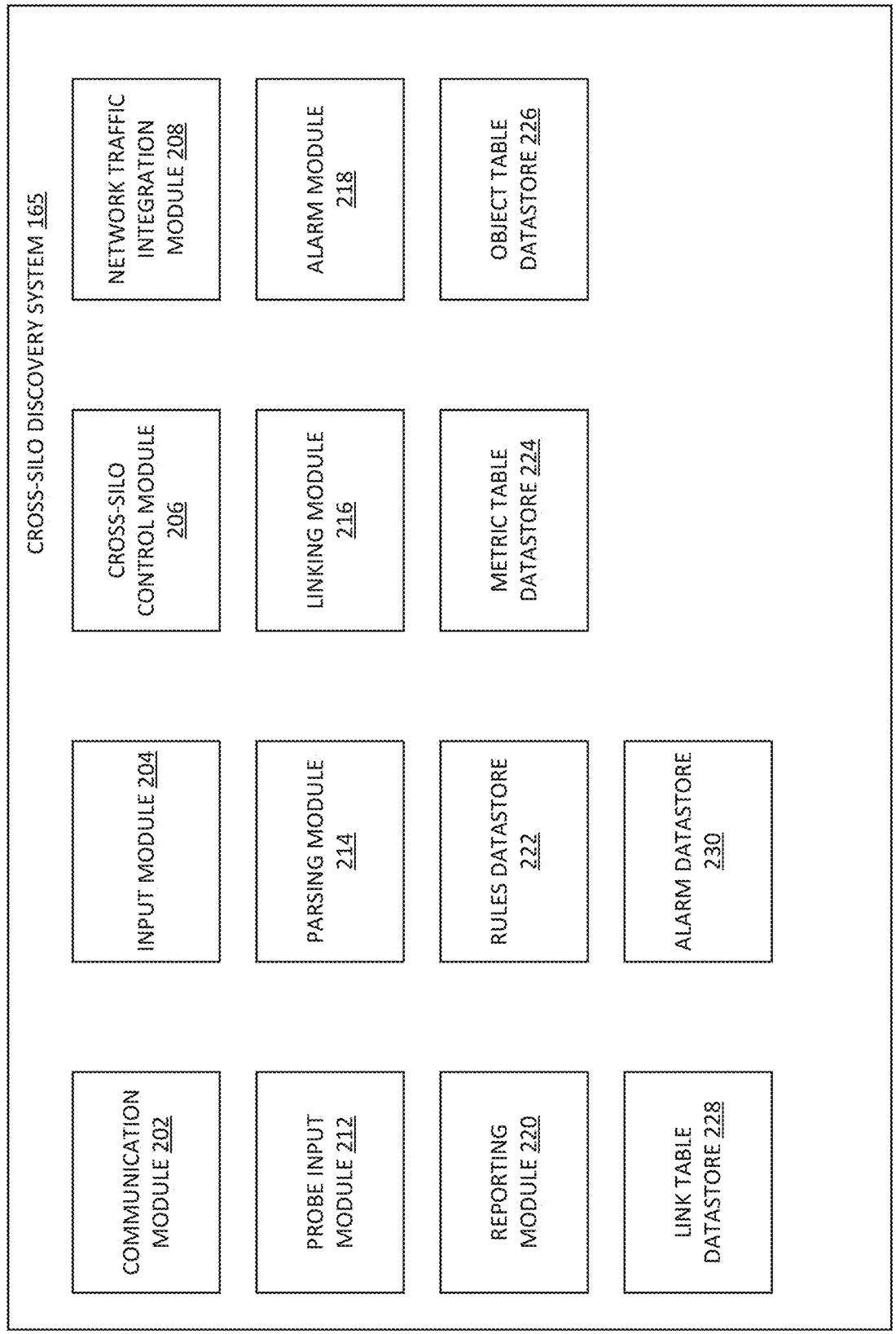
FIG. 2 depicts a block diagram of an example of a cross-silo discovery system according to some embodiments.

FIG. 2 depicts a block diagram of an example of a cross-silo discovery system 165 according to some embodiments. The cross-silo discovery system 165 includes a communication module 202, an input module 204, a cross-silo control module 206, a network traffic integration module 208, a probe input module 212, a parsing module 214, a linking module 216, an alarm module 218, a reporting module 220, a rules datastore 222, a metric table datastore 224, an object table datastore 226, a link table datastore 228, and an alarm datastore 230.

The communication module 202 may send and receive requests or data between any of the cross-silo discovery system 165, the application discovery system 170, the probes 155 and any of the entities of the enterprise network 105.

The communication module 202 may receive a request to send the list of applications from the IT administrator or another user of the enterprise network. The list of applications may include information regarding applications of the enterprise network 105 as well as attributes of applications. The list of applications may further include entities of the enterprise network 105 which make up each of any number of applications and attributes of each of any number of entities. In some embodiments, the list of applications further includes a tier of service associated with each application of the enterprise network 105. The communication module 202 may send the list of applications to the parsing module 214 to parse the received application data.

The communication module 202 may send a request to the probes 155 for network data. For example, the communication module 202 may facilitate a request from the cross-silo control module 206 to the probes 155 for network traffic data and storage monitoring data from the network switch probes and the software probes respectively.

The communication module 202 may receive a request from the cross-silo control module 206 to parse the received network traffic data from the cross-silo control module 206. The communication module 202 may send the request to the parsing module 214 to parse the network traffic data into object data and metric data.

The communication module 202 may facilitate a request from probe input module 212 to receive network data from the probes 155. In some embodiments, the communication module 202 may facilitate a request from probe input module 212 to receive network data from the application discovery system 170. In various embodiments, the communication module 202 may facilitate a request from probe input module 212 to receive network data from a flow source discovery system (not shown).

The communication module 202 may facilitate a request from probe input module 212 to the parsing module 214 to parse the received network traffic data. The communication module 202 may receive a request from the cross-silo control module 206 to parse the received storage monitoring data. The communication module 202 may receive the request from the cross-silo control module 206 and in response send the request to the parsing module 214 to received storage monitoring data into object data and metric data.

In some embodiments, the parsing module 214 may parse the received network data into object data and metric data. In response to the parsing module 214 identifying object data and metric data, the communication module 202 may receive a request from the parsing module 214 to create or update an object entry or a metric entry.

The communication module 202 may send a request to the metric table datastore 224 to create or update a metric entry of the metric entry table. The communication module 202 may send a request to the object table datastore 226 to create or update an object entry of the object entry table. The communication module 202 may send a request to the link table datastore 228 to create or update a link entry of the link entry table.

The communication module 202 may send a request to the alarm datastore 230 to update an alarm field. The alarm field may include an object performance threshold. The object performance threshold may be different depending on the object it is associated with. For example, a read response alarm associated with a host may have a read response alarm threshold that is different from a read response alarm threshold associated with an application or a read response alarm associated with a ScaleIO device. In some embodiments, the object performance threshold is a tiered object performance threshold. The tiered object performance threshold may be different depending on the tier of service of the associated network object. A tiered object performance threshold associated with a tier 0 device may be lower than a tiered object performance threshold associated with a tier 2 device, meaning that for an alarm measuring the same metric, the tier 0 alarm condition may be satisfied before the tier 2 alarm condition.

In the event that the alarm module 218 determines that a particular metric entry of a particular network object is greater than the object performance threshold associated with the particular metric and the particular network object, the communication module 202 may receive a request from the alarm module 218 to send an alarm trigger to the cross-silo control module 206. In other words, an application read response alarm may be triggered when the read response of an application instance is greater than an application read response threshold. A read response of a host associated with the same application instance may have no effect on the application read response alarm. Furthermore, the host read response threshold may be different from the application read response threshold.

The input module 204 may receive information from the IT administrator or other user of the enterprise network 105. The received information may include a list of applications known to the user. The received information may also include a list of some or all or some of the entities of the enterprise network 105, as well as attributes associated with entities of the enterprise network 105 such as a tier of service associated with the entity, name of the entity or type of entity. Some or all of the applications listed in the list of application may be parsed into object data by the parsing module 214. Some or all of the entities of the enterprise network 105 may be parsed into object data by the parsing module 214.

In some embodiments, the input module 204 may receive application data from the application discovery system 170. The application data may include application identifiers. The application data may also include attributes of the application.

The input module 204 may receive virtual machine data from any number of virtual machine data probes integrated within the enterprise network 105. In some embodiments, any number of virtual machine data probes may be a part of software integrated in a product suite such as VMware vSphere. The virtual machine data may indicate the application instances of the enterprise network 105 running on the virtual machine associated with the virtual machine data. In various embodiments, the virtual machine data includes virtual machine identifiers, each of which identify a virtual machine of the enterprise network 105 executing at least one application instances.

The virtual machine data may provide to the cross-silo discovery system 165 a real-time application to host mapping of the enterprise network 105. The cross-silo control module 206 may send this information to the parsing module 214 to update or create one or more of an object entry, a metric entry or a link entry. For example, virtual machine data which maps an email application to virtual machines and hosts of the enterprise network 105 may be used to create object entries of the email application, the virtual machines, and host associated with the email application. Metric entries may be created or updated for each metric of the application instance or entities of the enterprise network 105 which make up the email application. In some embodiments, link entries may be created which links email application object entry to one or more email application instances object entries. Link entries may also be created which links object entries which represent each of the entities which make up the email application to the email application object entry. In various embodiments, link entries may be created which links one object entry to one metric entry.

Figure 4:
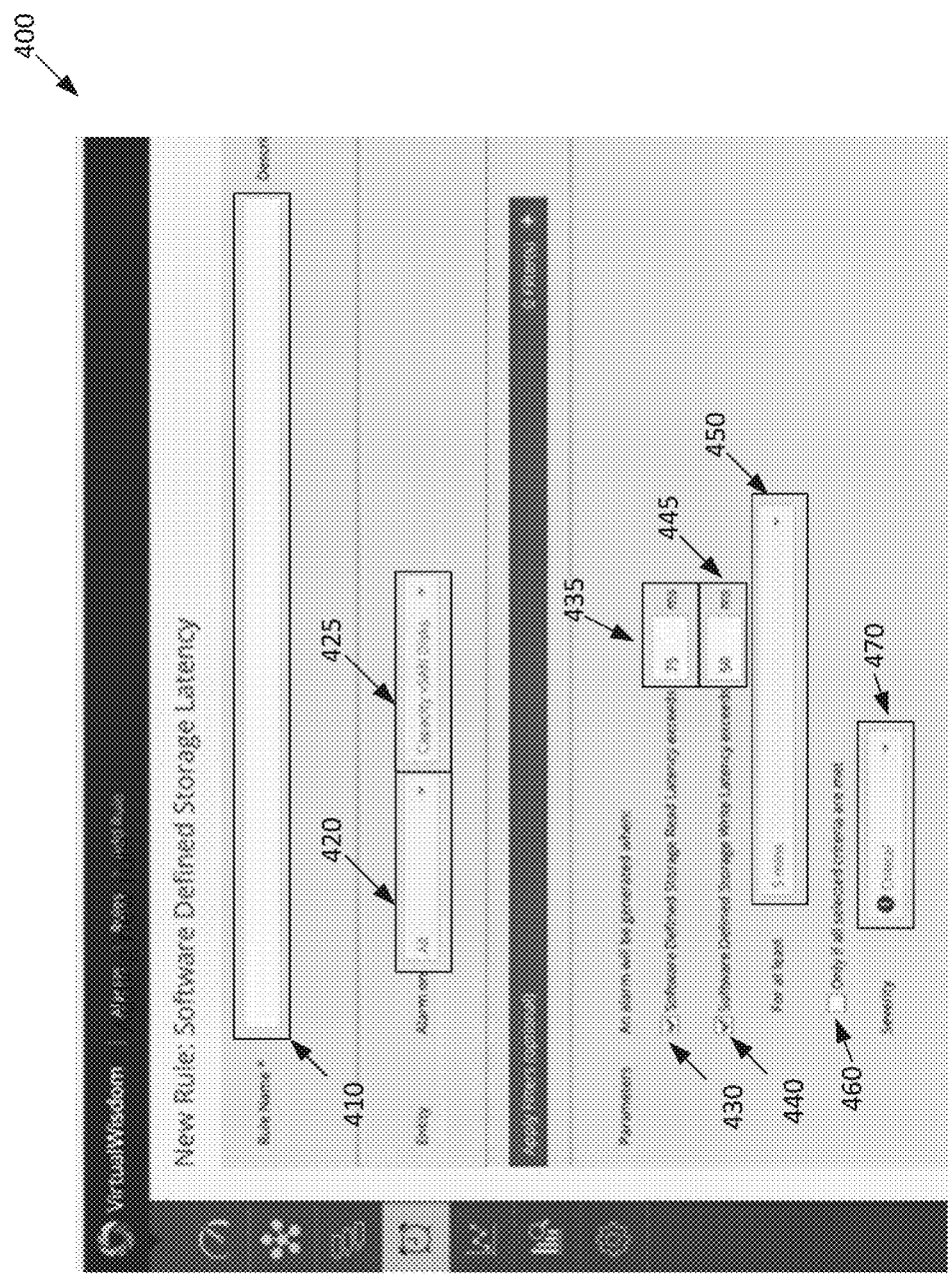
FIG. 4 depicts an example rule input interface according to some embodiments.

The IT administrator or other user of the enterprise network 104 may interact with an alarm input interface, and in response, the input module 204 may receive input related to the interaction. The IT administrator may interact with an example alarm interface 400 of FIG. 4 and customize one or more components of an alarm. For example, the IT administrator may choose to interact with field 410 and enter a name of the alarm or rule.

The IT administrator or other user of the enterprise network 105 may interact with the example alarm interface and customize one or more components of the alarm or rule. For example, the IT administrator may choose to interact with field 410 and enter a name for the rule or alarm. In some embodiments, the IT administrator may choose to interact with pull down menu in area 420 to specify a category of entity of the enterprise network 105 to apply the rule to. The IT administrator may choose to interact with pull down menu in area 425 to specify a sub-category of entity of the enterprise network 105 to apply the rule to. By interacting with field 430, the software defined storage read latency threshold may be included in the rule. If the IT administrator chooses to include the software defined storage read latency in the rule, the IT administrator may enter a value in field 435 to specify a software defined storage read latency threshold. By interacting with field 440, the software defined storage write latency threshold may be included in the rule. If the IT administrator chooses to include the software defined storage write latency in the rule, the IT administrator may enter a value in field 445 to specify a software defined storage write latency threshold. Pull down field 450 may specify a duration in which the software defined storage read latency and/or software defined storage write latency has to exceeded its respective threshold before an alarm condition is satisfied. By interacting with field 460, the IT administrator can specify that both latency thresholds has to be exceeded before the alarm condition is satisfied. Field 470 allows the IT administrator to choose the severity of alarm.

In response to the reporting module 220 outputting an alarm notification, the input module 204 may receive from the IT administrator or other user of the enterprise network 105, a change ticket to the enterprise network 105. In some embodiments, the change ticket includes at least one change to one or more entities of the enterprise network 105 or one or more connections between entities of the enterprise network 105. In various embodiments, the input module 204 may send the change ticket to the IT management software platform, or the application performance integration platform.

The cross-silo control module 206 may receive network data from the probes 155. The network data includes network traffic data from the network switch probes and storage monitoring data from the software probes.

The network traffic data includes at least one of a source entity of the enterprise network, a destination entity of the enterprise network, and metrics of the network traffic. The metrics of the network traffic data includes at least one of a type of flow source, read speed total byte count, incoming byte count, outgoing byte count, incoming bit rate, outgoing bit rate, and total packet rate. The cross-silo control module 206 may send a request to the parsing module 214 to parse the network traffic data.

The cross-silo control module 206 may receive a request from the parsing module 214 to create or update an object entry based on the parsing of the received network data. The cross-silo control module 206 may receive a request from the parsing module 214 to create or update a metric entry based on the parsing of the received network data. The cross-silo control module 206 may receive the request to create or update the object entry and the metric entry and send a request to the object table datastore 226 and metric table datastore 224 respectively. In some embodiments, the parsing module 214 may send the request to create or update the object entry or the metric entry directly to the object table datastore 226 and metric table datastore 224 respectively.

Object data of the storage monitoring data may include an IP address of a ScaleIO storage device, communication exchange between an entity of the software-only server-based SAN and an entity of the enterprise network, and communication exchange between the entity of the software-only server-based SAN and a network object. The metrics data of the storage monitoring data may include average read latency, average write latency, primary read from device IOPS, and primary write IOPS, user data read IOPS, user data write IOPS, number of ScaleIO devices, total read throughput, and total write throughput.

The cross-silo control module 206 may receive a request from the parsing module 214 to create or update an object entry based on the parsing of the received storage monitoring data. The cross-silo control module 206 may receive a request from the parsing module 214 to create or update a metric entry based on the parsing of the received network data. In some embodiments, the parsing module 214 may send the request to create or update the object entry or the metric entry directly to the object table datastore 226 and metric table datastore 224 respectively.

In some embodiments, the received network data is application data. The cross-silo control module 206 may receive application data from the application discovery system 170. The cross-silo control module 206 may send this information to update or create one or more of an object entry, a metric entry or a link entry to the parsing module 214. In some embodiments, the parsing module 214 may send the request to create or update the object entry or the metric entry directly to the object table datastore 226 and metric table datastore 224 respectively.

For example, the cross-silo control module 206 may receive a request from the parsing module 214 to create an object entry based on an application instance of a virtual desktop infrastructure (VDI) application. The cross-silo control module 206 may also receive a request from the parsing module 214 to create an object entry for each entity of the enterprise network 105 which make up the VDI application. The cross-silo control module 206 may receive a request to create link entries which links object entries which represent each of the entities which make up the VDI application to object entry associated with entities of the enterprise network 105 which make up the VDI application. The cross-silo control module 206 may receive a request to create a metric entry for each metric of the VDI application instance or entities of the enterprise network 105 which make up the VDI application. For example, a metric entry associated with the VDI application may be an application read response.

When the alarm module 218 determines that the application read response is greater than the object performance threshold, the alarm module 218 may send a request of an alarm trigger to the cross-silo control module 206. The cross-silo control module 206 may receive the alarm trigger from the alarm module 218. In response to receiving the alarm trigger, the cross-silo control module 206 may send a request to the reporting module 220 to output an alarm notification.

The network traffic integration module 208 may receive network traffic data from the probe input module 212. In some embodiments, the network traffic integration module 208 may receive network traffic data directly from the network traffic software platform.

Software platforms such as NetFlow logs flow records which, in some embodiments, is a summary of the interaction between two IP addresses. The network traffic integration module 208 may retrieve flow records between IP addresses of the enterprise network 105 from switches enabled with network traffic software, such as NetFlow. These flow records may be analyzed by the cross-silo control module 206 to determine possible applications and possible network endpoints.

In some embodiments, the network traffic integration module 208 retrieve flow records from NetFlow during scheduled retrieval periods. The scheduled retrieval may be accomplished by a scheduling module. The network traffic integration module 208 may retrieve, from the input module, flow records from a specific IP address. In some embodiments, these specific IP addresses may represent flow source important to the operations of the enterprise network 105.

The probe input module 212 may receive network traffic data from the network switch probes of probes 155. The network traffic data includes at least one of a source entity of the enterprise network, a destination entity of the enterprise network, and metrics of the network traffic. The metrics of the network traffic data includes at least one of a type of flow source, read speed total byte count, incoming byte count, outgoing byte count, incoming bit rate, outgoing bit rate, and total packet rate.

In some embodiments, the network traffic data may be in the form of flow packets. Each flow packet includes any number of flow records, a template record, and a packet header. Any number of flow records may provide information associated with each flow. In various embodiments, the data packet includes one or more template identifiers. Each of the flow records may be generated by one of any number of flow sources in a data path.

A template record may be used to recognize a format of the subsequent flow records that may be received in the current or future data packets. For example, there may be different formats (e.g., and therefore different template records to recognize the different formats) for sFlow data packets, Jflow data packets, and Cflow data packets. In various embodiments, different versions of the same type of data packet may have different templates. For example, there are multiple versions of Cisco's NetFlow software platform, and each version may have a different template record because data from different versions of the platform may have different formats. In some embodiments, the cross-silo discovery system 165 may need to match the template record of an incoming data packet with a template record stored in the cross-silo discovery system 165 before the incoming network can be parsed. In various embodiments, the template record includes or identifies a template.

A packet header may include information regarding the packet, such as the version of the network traffic analyzing software platform associated with the data packet, the number of flow records contained within the data packet, and a sequence number. The sequence number may aid in detecting lost data packets.

A template identifier (ID) may be a number which may distinguish one template record from other template records produced by the same export device. A flow collector may receive export packets from different switching hardware devices, and the uniqueness of template records may not be guaranteed across different switching hardware devices. In some embodiments, the flow collect may store the IP address of the switching hardware device that produced the template ID in order to assist in the enforcement of uniqueness. The parsing module 214 may utilize the template identifier to parse the network traffic data.

The probe input module 212 may receive storage monitoring data from the software probes of probes 155. Object data includes an IP address and attributes of the network object. Different types of network objects may have different attributes. For example, a ScaleIO device may have attributes such as the capacity of the ScaleIO device.

The probe input module 212 may receive application data from the application discovery system 170. The application data may include attributes of the application such as a tier of service of the application, a name of the application, and entities of the enterprise network which make up the application. In some embodiments, the application data includes application metrics such as application read response time and application write response time.

In various embodiments, the probe input module 212 may receive from a third party virtualization platform, virtual machine data may provide to the cross-silo discovery system 165 a real time application to host mapping of the enterprise network 105. The cross-silo control module 206 may send this information to update or create one or more of an object entry, a metric entry or a link entry to the parsing module 214.

The parsing module 214 may parse the received network data to identify object data and metric data. The received network data may include network traffic data and storage monitoring data. In some embodiments, the received network data may include application data received from the application discovery system 170.

The parsing module 214 may parse the application data to identify object data and metric data. Object entries may be created for each application instance, and entities of the network which make up the application instance. The object entry may also include attributes of the application. Metric entries may be created for each application metrics parsed by the parsing module 214.

The parsing module 214 may use the template identifier to parse the network traffic data into one or more data packets. Each data packet may include an IP address associated with the source entity of the enterprise network 105, or the source IP address, an IP address associated with the destination entity of the enterprise network 105, or the destination IP address, an IP address associated with the switch or router which generated the network traffic data, or switch fabric IP address, attributes associated with the source IP address, destination IP address and switch fabric IP address, and metrics of the communication.

The parsing module 214 may parse the IP addresses and attributes associated with the IP addresses into object data. The attributes associated the source IP address, the destination IP address, and the switch fabric IP address include the manufacturer of the router or switch, such as Juniper, and the version of the traffic monitoring software integrated into the router. The parsing module 214 may send a request to the object table datastore 226 to create or update an object based on the IP addresses and attributes associated with the IP address.

The parsing module 214 may parse the metrics of network traffic data into metrics data. The metric or attributes of the communication may include read speed total byte count, incoming byte count, outgoing byte count, incoming bit rate, outgoing bit rate, and total packet rate. The parsing module 214 may send a request to the metric table datastore 224 to create or update a metric entry based on the metrics of the storage monitoring data.

The parsing module 214 may parse the received storage monitoring data into object data and metric data. The parsing module 214 may analyze the received storage monitoring data and recognize IP addresses based on the format of the data, since IP address data is an arrangement of numbers in a certain format. The storage monitoring data includes an IP address of a ScaleIO storage device, communication exchange between an entity of the software-only server-based SAN and an entity of the enterprise network, and communication exchange between the entity of the software-only server-based SAN and a network object. The storage monitoring data may also include attributes of the IP address such as the component of the ScaleIO platform the data comes from, such as the Meta Data Manager, the ScaleIO Data Server or the ScaleIO Data Client. The metrics of the storage monitoring data include average read latency, average write latency, primary read from device IOPS, and primary write IOPS, user data read IOPS, user data write IOPS, number of ScaleIO devices, total read throughput, and total write throughput.

The parsing module 214 may parse the IP addresses and attributes associated with the IP addresses into object data. For example, the parsing module 214 may send a request to the object table datastore 226 to create or update an object entry based on the IP address of the ScaleIO storage device.

The parsing module 214 may parse the metrics of network traffic data into metrics data. For example, the parsing module 214 may send a request to the metric table datastore 224 to create or update a metric entry based on the metrics of the storage monitoring data.

The linking module 216 may send a request to the link table datastore to create or update a link entry. The link entry which links an object entry with a metric entry may include an object performance threshold associated with the object and metric. In some embodiments, the link entry may link: two object entries together or one metric entry with one object entry. In various embodiments, the link entry may contain an alarm field, the alarm field identifying one or more rules of the rules datastore 222 which the link entry is subject to. In some embodiments, the link entry may contain a link to an alarm entry of the alarm datastore 230. Each rule which the link entry is subject to may include an object performance threshold. The object performance threshold identifies a threshold of a metric associated with a particular network object.

The alarm module 218 may compare the object performance threshold with the metric entry associated with the network object. The alarm 218 may determine if an alarm trigger is satisfied based on the comparison.

In the event alarm module 218 determines that a particular metric entry of a particular network object is greater than the object performance threshold associated with the particular metric and the particular network object, the alarm module 218 may a request to the cross-silo control module 206 of the alarm trigger.

The alarm datastore 218 may send a request to the cross-silo control module 206 to send an alarm notification when the alarm trigger condition is satisfied. The notification may be in the form of pop-up window in the cross-silo discovery system 165, an email or text sent to designated users of the enterprise network 105 or a phone call to the designated user of the enterprise network 105. In some embodiments, if multiple alarms trigger on one entity of the enterprise network during a particular interval, the cross-silo control module 206 may group any number of alarms into one notification. In various embodiments, if multiple entities of the enterprise network 105 of the same tier of service trigger the same alarm during a particular interval, the cross-silo control module 206 may group the notification of multiple instances of the same alarm of the same tier of service over the multiple entities of the enterprise network 105.

The alarm field may include an object performance threshold. The object performance threshold may be different depending on the object it is associated with. For example, a read response alarm associated with a host may have a read response alarm threshold that is different from a read response alarm associated with an application or a read response alarm associated with a ScaleIO device.

In response to receiving the alarm trigger event, the alarm module 218 may send a request to the reporting module 220 to output an alarm notification. The reporting module 220 may output an alarm input interface such as the example alarm interface 400 of FIG. 4.

The reporting module 220 may receive the request from the alarm module 218 to output the alarm notification from the cross-silo control module 206.

In various embodiments, the reporting module 220 may manage alarms by the case, with multiple instances of the same alarm track against an original case until it is closed, enabling the user of the enterprise network 105 to view trends and assess urgency. To minimize distractions and interruptions to the IT administrator or other user of the enterprise network 105, if the same types of alarms are triggered within a predetermined interval, they may be combined into a single notification. The notification including email, text message, phone call or other forms of communication to the IT administrator or other user of the enterprise network 105.

Figure 5:
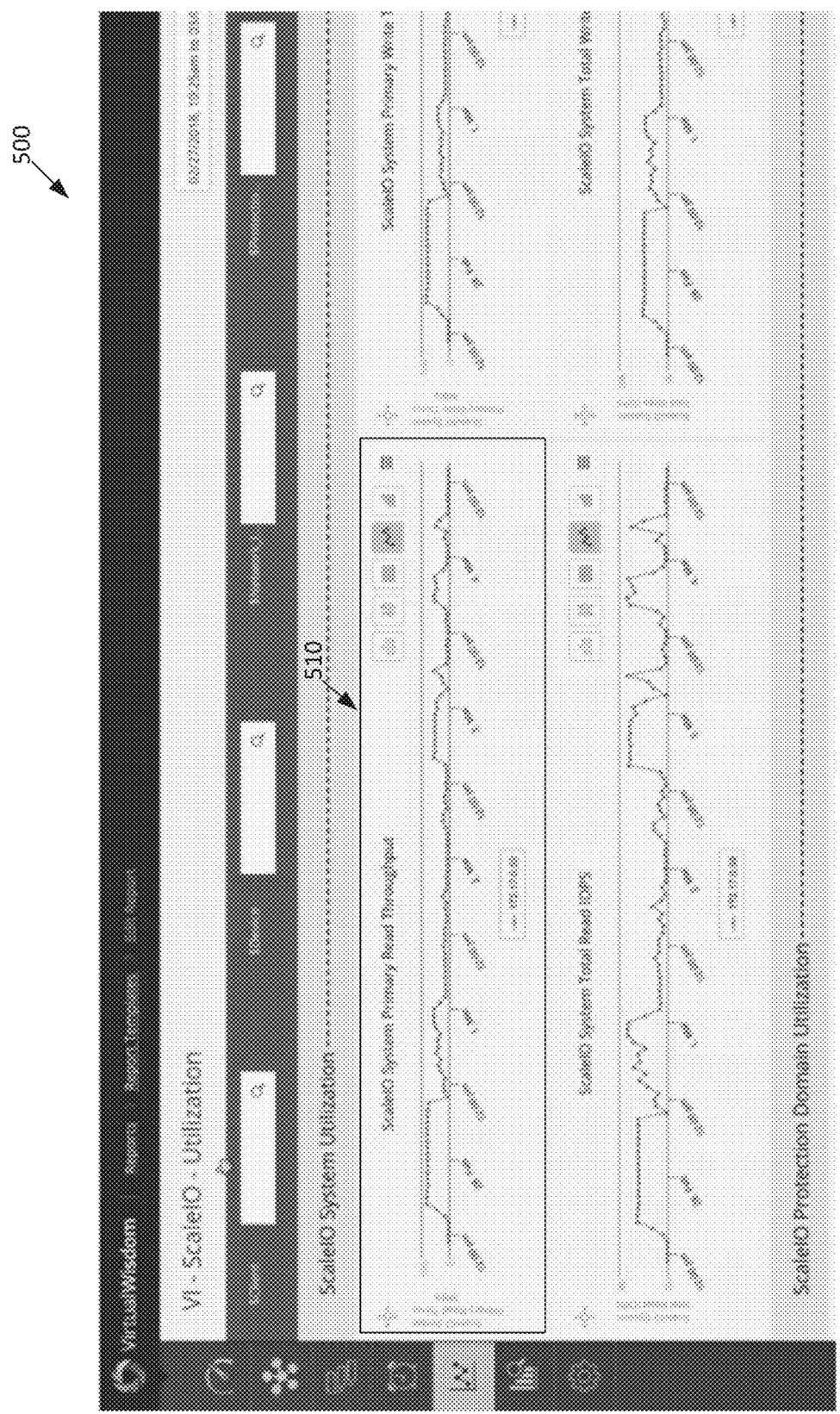
FIG. 5 depicts an example cross-silo discovery system report output interface according to some embodiments.
Figure 6:
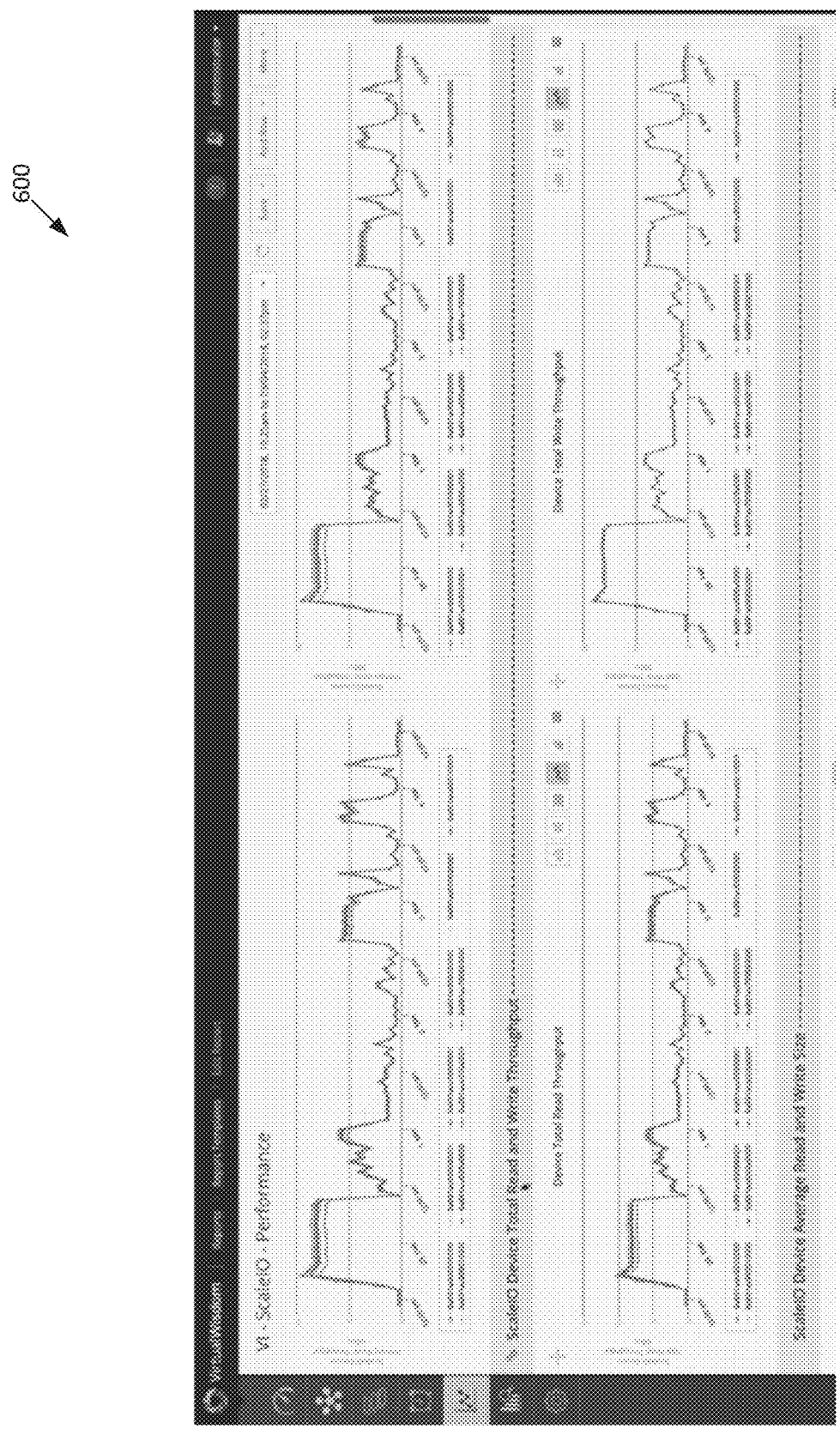
FIG. 6 depicts another example cross-silo discovery system report output interface according to some embodiments.

The reporting module 220 may receive a request to output reports of metrics received from the software-only server-based SAN. The reporting module 220 may output the reports in the form of tables or graphs. An example report may be found in an example report output interface 500 of FIG. 5. Area 510 of the example report output interface 500 displays a primary read throughput line graph. The IT administrator may interact with the line graph in area 510 and view the values of the primary read throughput which make up the line graph. The IT administrator may interact with other icons in area 510 to view the primary read throughput in different formats such as a bar graph, a chart, etc. The reporting module 220 may output other reports such as example report output interface 600 of FIG. 6.

In some embodiments, the tier of service associated with the alarm may determine the type of notification sent to the designated user of the enterprise network 105. For example, the triggering of a tier 3 alarm may result in a pop up window in the alarm output interface, while the triggering of a tier 0 alarm may result in the pop up window in the alarm output interface as well as an email sent to the designated user of the enterprise network 105.

The rules datastore 222 may be any structure and/or structures suitable for storing data entries or records (e.g., an active database, a relational database, a self-referential database, a table, a matrix, an array, a flat file, a documented-oriented storage system, a non-relational No-SQL system, an FTS-management system such as Lucene/Solar, and the like). The rules table datastore 224 may receive a request to create or update a rule or an alarm entry. The rule entry or alarm entry may include an object performance threshold.

The metric table datastore 224 may be any structure and/or structures suitable for storing data entries or records (e.g., an active database, a relational database, a self-referential database, a table, a matrix, an array, a flat file, a documented-oriented storage system, a non-relational No-SQL system, an FTS-management system such as Lucene/Solar, and the like). The metric table datastore 224 may receive a request from the parsing module 214 to create or update a metric entry. A newly created or updated metric entry may be updated to a metric table. The metric table may include metric entries. Each metric entry may represent one metric associated with one network object of the enterprise network 105. Attributes associated with each metric entry may vary depending on the source of the metric entry. For example, attributes associated with a metric entry which is parsed from the received network traffic data may be different from attributes associated with a metric entry which is parsed from the received storage monitoring data. Each metric entry may represent one metric associated with one network object of the enterprise network 105. One object entry may be associated with multiple metric entries. Each metric may be associated with multiple object entries. As the probes receive new data, the metric entry may change, as the value of the metric changes.

The object table datastore 226 may be any structure and/or structures suitable for storing data entries or records (e.g., an active database, a relational database, a self-referential database, a table, a matrix, an array, a flat file, a documented-oriented storage system, a non-relational No-SQL system, an FTS-management system such as Lucene/Solar, and the like). The object table datastore 226 may receive a request from the parsing module 214 to create or update an object entry. A newly created or updated object entry may be updated to an object table. The object table may include object entries. Each object entry may represent one network object of the enterprise network 105. Network objects includes physical and virtual entities of the network which communicate with each other by receiving, sending, and transmitting data. In some embodiments, network objects include virtual machines (VMs), hosts, applications, servers, routers, switches, and storage devices.

The link table datastore 228 may be any structure and/or structures suitable for storing data entries or records (e.g., an active database, a relational database, a self-referential database, a table, a matrix, an array, a flat file, a documented-oriented storage system, a non-relational No-SQL system, an FTS-management system such as Lucene/Solar, and the like). The link table datastore 228 may receive a request from the communication module 202 to create or update an link entry.

A link entry which links an object entry with a metric entry may include an object performance threshold associated with the object and metric. For example, the email application instance object entry linked with an application response time may have an application read response alarm or rule and an application read response threshold. In some embodiments, the link entry may include an object performance threshold field.

The alarm datastore 230 may be any structure and/or structures suitable for storing data entries or records (e.g., an active database, a relational database, a self-referential database, a table, a matrix, an array, a flat file, a documented-oriented storage system, a non-relational No-SQL system, an FTS-management system such as Lucene/Solar, and the like). The alarm entry may include properties of an alarm or rule of the cross-silo discovery system 165. Properties of the alarm or rule include an object performance threshold, a category and sub-category of entities of the enterprise network 105 to apply the alarm to, the IT administrator may choose to customize the properties of the alarm by interacting with an alarm input interface such as example interface 400 of FIG. 4.

In response to receiving the alarm event, the alarm datastore 230 may create or update one of any number of alarm entries. Each of any number of alarm entries include, but is not limited to, attributes of the alarm such as name of the metric or property being measured by the alarm, alarm threshold, polling window, polling interval, and/or alarm count.

Alarms may be managed on an entity by entity basis in terms of a case. Multiple instances of the same alarm track against the original case until it is close. For example, the cross-silo control module 206 may determine that a tier 0 host triggers the host read-response alarm threshold of 30 ms during the polling window of 1 minute. In response to the triggering of this alarm, the alarm module datastore may receive a request to increment the alarm count.

In various embodiments, each alarm entry includes a tier metrics threshold, with different tiers of the same metric having different thresholds. An alarm trigger condition may be satisfied if the metric associated with a particular entity of the enterprise network exceeds the object performance threshold. When the alarm trigger is satisfied based on the comparison between metrics from one or more entities of the enterprise network 105 including virtual machines and hosts, and the associated object performance threshold, the cross-silo control module 206 may send a request to output an alarm notification. The request to output the alarm notification may be sent to the reporting module 220. For example, a tier 0 host read-response threshold may be 30 ms, while a tier 1 host read-response threshold may be 50 ms. An alarm trigger condition may be satisfied if the host read-response of a tier 0 host exceeds 30 ms.

Figure 3:
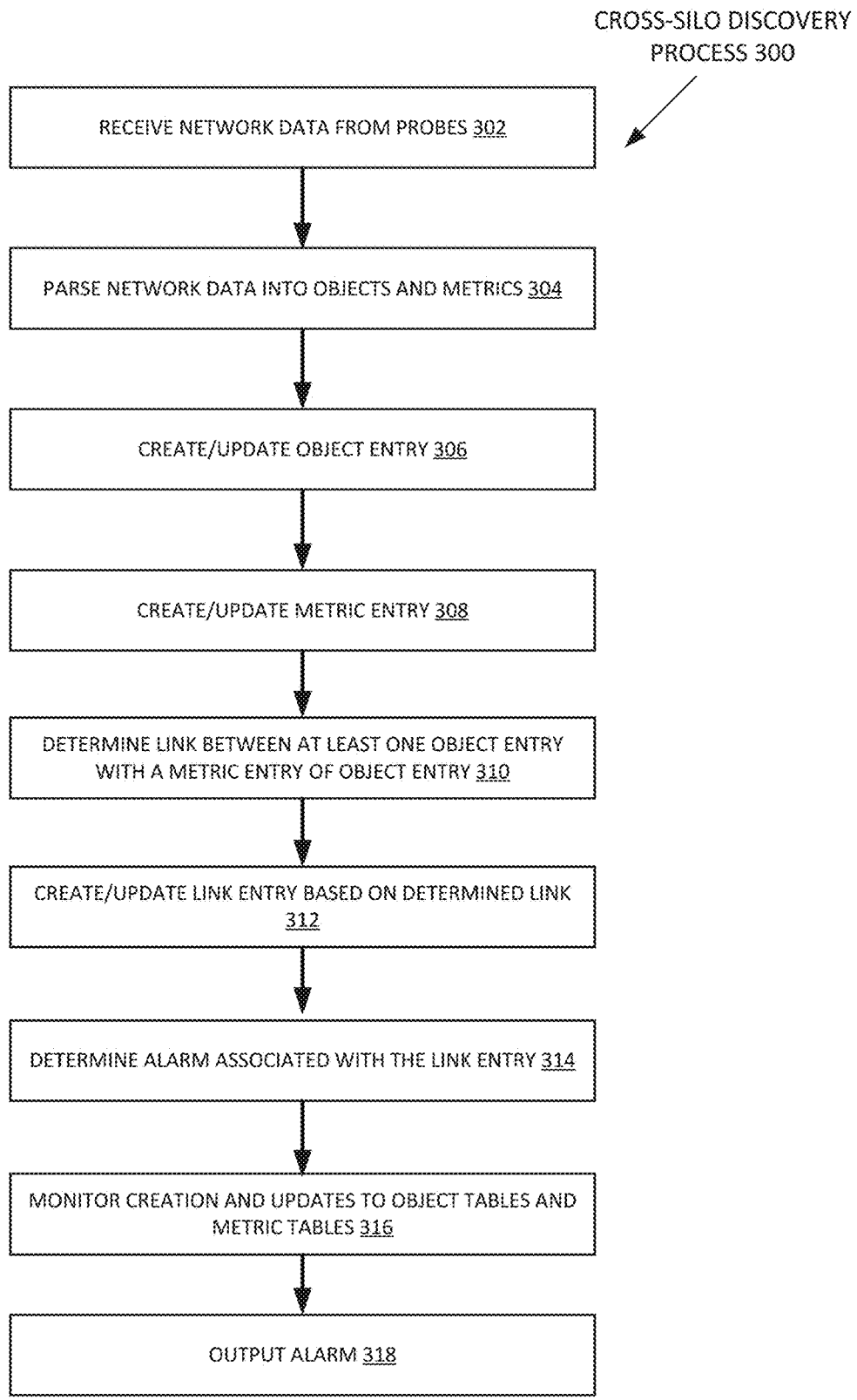
FIG. 3 depicts a flowchart of a cross-silo discovery system according to some embodiments.

FIG. 3 depicts a flowchart 300 of a cross-silo discovery system according to some embodiments.

In step 302, the communication module 202 sends a request to the probes 155 for network data. The probe input module 212 may receive the network data from the probes 155. The network data may include network traffic data from a network traffic software platform, storage monitoring data from software-only server-based SAN such as Dell EMC ScaleIO, application data from the application discovery system 170, and virtual machine data from a third party virtualization platform such as VMware vSphere. In some embodiments, the network traffic data may be received by the network traffic integration module 208.

In step 304, the parsing module 214 parses the received network data to identify object data and metric data. The received network data may include network traffic data and storage monitoring data. The parsing module 214 may use a template identifier to parse the network traffic data into one or more data packets. The object data may include at least one of a source entity of the enterprise network, a destination entity of the enterprise network, and metrics of the network traffic. The metrics of the network traffic data includes at least one of a type of flow source, read speed total byte count, incoming byte count, outgoing byte count, incoming bit rate, outgoing bit rate, and total packet rate.

The parsing module 214 may parse the received storage monitoring data into object data and metric data. The parsing module 214 may analyze the received storage monitoring data and recognize IP addresses based on the format of the data, since IP address data is an arrangement of numbers in a certain format. Object data includes an IP address and attributes of the network object. Different types of network objects may have different attributes. For example, a ScaleIO device may have attributes such as the capacity of the ScaleIO device. The metrics of the storage monitoring data include average read latency, average write latency, primary read from device IOPS, and primary write IOPS, user data read IOPS, user data write IOPS, number of ScaleIO devices, total read throughput, and total write throughput.

The parsing module 214 may parse the application data to identify object data and metric data. Object data may include information regarding application instances, attributes of the application instances, and entities of the network which make up the application instance. In some embodiments, metric data include time-varying metrics associated with each application instance such as a read response for an application instance.

The parsing module 214 may parse the virtual machine data to identify object data and metric data. Object data may include virtual machine identifiers. Each virtual machine identifier may identify a virtual machine of the enterprise network 105. Metric data may include attributes of the virtual machine. Attributes of the virtual machine data may include, but is not limited to, any or all of the following: a tier of service of the virtual machine, a percent CPU idle, a percent CPU idle, a CPU utilization, and/or a CPU usage MHz.

In step 306, the parsing module 214 may send a request to the object table datastore 226 to create or update an object entry based on the parsed object data. In some embodiments, the cross-silo control module 206 may send the request to the object table datastore 226 to create or update the object entry. Each object entry may represent one network object of the enterprise network 105. In some embodiments, network objects include virtual machines (VMs), hosts, applications, servers, routers, switches, and storage devices.

In step 308, the parsing module 214 may send a request to the metric table datastore 224 to create or update a metric entry based on the parsed metric data. In some embodiments, the cross-silo control module 206 may send the request to the metric table datastore 224 to create or update the metric entry. Each metric entry may represent one metric associated with one network object of the enterprise network 105. One object entry may be associated with multiple metric entries. Each metric may be associated with multiple object entries.

In step 310 the linking module 216 may determine a link between an object entry and a metric entry. In some embodiments, the linking module 216 may determine a link between two object entries.

In step 312, the linking module 216 may send a request to the link table datastore to create or update a link entry based on the link determined by the linking module 216. A link entry links an object entry with a metric entry and may include an object performance threshold associated with the object and metric. The link entry may be updated as the metric associated with the link changes. In some embodiments, the link entry may contain a pointer to an alarm entry of the alarm datastore 230.

In step 314, the cross-silo control module 206 monitors the creation and update of metric entries and object entries to obtain real-time view of the performance, health and capacity of the enterprise network, including a software-only server-based SAN. As new data is received by the probes 155, the parsing module 214 may create or update the metric entry or object entry as needed to obtain real-time view of the metrics and network objects of the enterprise network 105.

In step 316, the alarm module 218 determines if a particular metric entry of a particular network object is greater than the object performance threshold associated with the particular metric. If so, the alarm trigger for that particular alarm is satisfied.

In one embodiment, the alarm module 218 may compare the alarm entity of each network object with the metric entity associated with the same network object. The alarm entity may include the object performance threshold for a particular metric, while the metric entry may include a most up to date metric for the same network object. In some embodiments, the object performance threshold based on the tier of service of the network object associated with the alarm entity.

In step 318, when the alarm module 218 determines that the alarm condition is satisfied, the alarm module 218 sends an alarm event to the cross-silo control module 206. In response to the cross-silo control module 206 receiving the alarm event, the cross-silo control module 206 may send a request to the alarm datastore to increment an alarm count field of the alarm entry. The alarm module 218 may send a request to the reporting module 220 to output an alarm notification.

The notification may be in the form of pop-up window in the cross-silo discovery system 165, an email or text sent to designated users of the enterprise network 105 or a phone call to the designated user of the enterprise network 105. In some embodiments, if multiple alarms trigger on one entity of the enterprise network during a particular interval, the cross-silo control module 206 may group any number of alarms into one notification. In various embodiments, if multiple entities of the enterprise network 105 of the same tier of service trigger the same alarm during a particular interval, the cross-silo control module 206 may group the notification of multiple instances of the same alarm of the same tier of service over the multiple entities of the enterprise network 105.

The alarm field may include an object performance threshold. The object performance threshold may be different depending on the object it is associated with. For example, a read response alarm associated with a host may have a read response alarm threshold that is different from a read response alarm associated with an application or a read response alarm associated with a ScaleIO device.

In some embodiments, the cross-silo control module 206 may a request to output an alarm notification to the reporting module 220.

Figure 7:
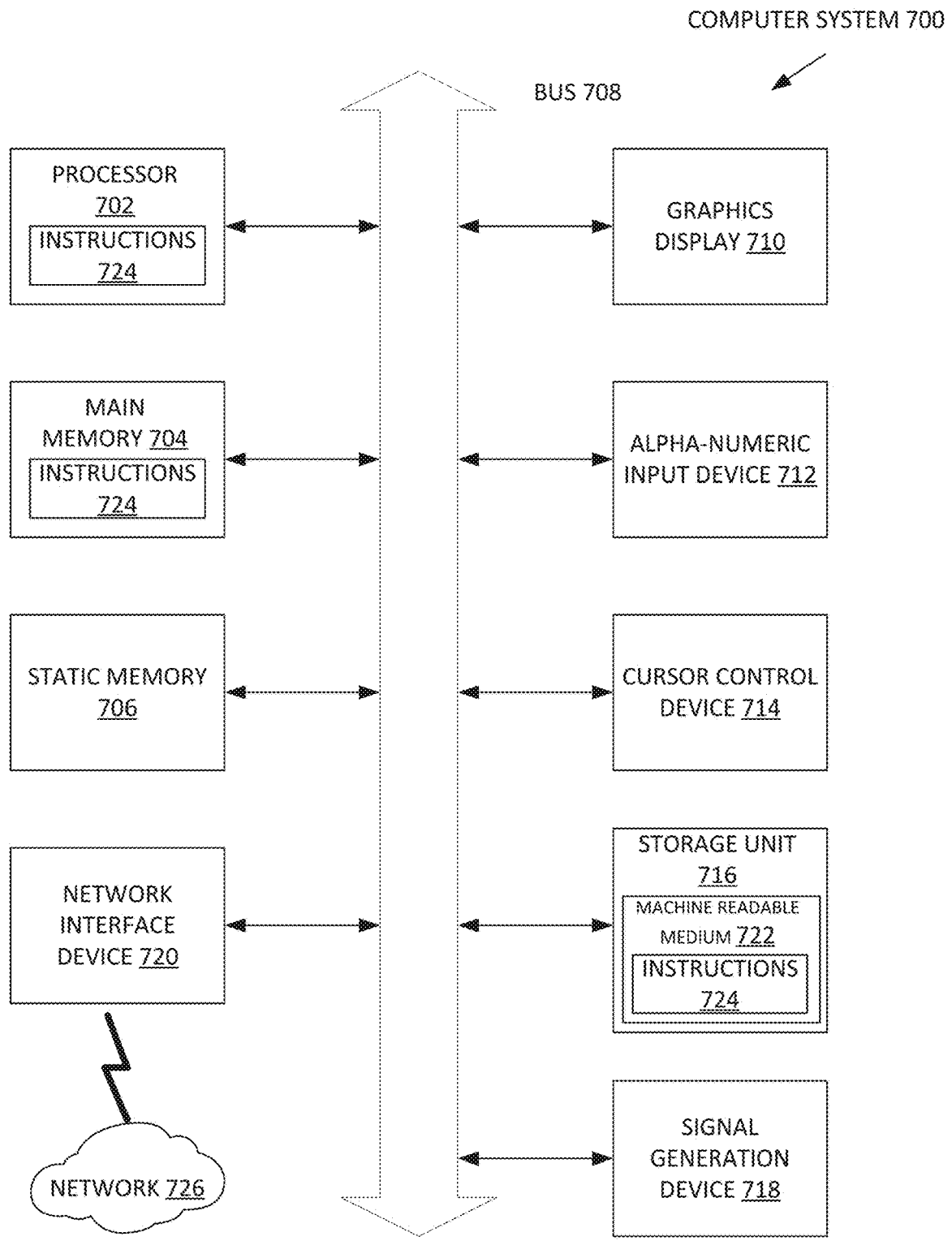
FIG. 7 depicts a block diagram illustrating entities of an example machine according to some embodiments.

FIG. 7 is a block diagram illustrating entities of an example machine able to read instructions from a machine-readable medium and execute those instructions in a processor to perform the machine processing tasks discussed herein, such as the engine operations discussed above. Specifically, FIG. 7 shows a diagrammatic representation of a machine in the example form of a computer system 700 within which instructions 724 (e.g., software) for causing the machine to perform any one or more of the methodologies discussed herein may be executed. In alternative embodiments, the machine operates as a standalone device or may be connected (e.g., networked) to other machines, for instance via the Internet. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web application, a network router, switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes a processor 702 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 704, and a static memory 706, which are configured to communicate with each other via a bus 708. The computer system 700 may further include graphics display unit 710 (e.g., a plasma display panel (PDP), a liquid crystal display (LCD), a projector, or a cathode ray tube (CRT)). The computer system 700 may also include alphanumeric input device 712 (e.g., a keyboard), a cursor control device 714 (e.g., a mouse, a trackball, a joystick, a motion sensor, or other pointing instrument), a data store 716, a signal generation device 718 (e.g., a speaker), an audio input device 726 (e.g., a microphone) and a network interface device 720, which also are configured to communicate via the bus 708.

The data store 716 includes a machine-readable medium 722 on which is stored instructions 724 (e.g., software) embodying any one or more of the methodologies or functions described herein. The instructions 724 (e.g., software) may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 (e.g., software) may be transmitted or received over a network (not shown) via network interface 720.

While machine-readable medium 722 is shown in an example embodiment to be a single medium, the term "machine-readable medium" should be taken to include a single medium or multiple media (e.g., a centralized or distributed database, or associated caches and servers) able to store instructions (e.g., instructions 724). The term "machine-readable medium" shall also be taken to include any medium that is capable of storing instructions (e.g., instructions 724) for execution by the machine and that cause the machine to perform any one or more of the methodologies disclosed herein. The term "machine-readable medium" includes, but should not be limited to, data repositories in the form of solid-state memories, optical media, and magnetic media.

In this description, the term "module" refers to computational logic for providing the specified functionality. A module can be implemented in hardware, firmware, and/or software. Where the modules described herein are implemented as software, the module can be implemented as a standalone program, but can also be implemented through other means, for example as part of a larger program, as a plurality of separate programs, or as one or more statically or dynamically linked libraries. It will be understood that the named modules described herein represent one embodiment, and other embodiments may include other modules. In addition, other embodiments may lack modules described herein and/or distribute the described functionality among the modules in a different manner. Additionally, the functionalities attributed to more than one module can be incorporated into a single module. In an embodiment where the modules as implemented by software, they are stored on a computer readable persistent storage device (e.g., hard disk), loaded into the memory, and executed by one or more processors as described above in connection with FIG. 7. Alternatively, hardware or software modules may be stored elsewhere within a computing system.

As referenced herein, a computer or computing system includes hardware elements used for the operations described here regardless of specific reference in FIG. 7 to such elements, including for example one or more processors, high speed memory, hard disk storage and backup, network interfaces and protocols, input devices for data entry, and output devices for display, printing, or other presentations of data. Numerous variations from the system architecture specified herein are possible. The entities of such systems and their respective functionalities can be combined or redistributed.

The invention claimed is:

1. A system comprising:
one or more processors;
memory containing instructions configured to control the one or more processors to:
receive network traffic data from a network traffic monitoring platform, the network traffic monitoring platform being in communication with an enterprise network, the network traffic data identifying communication between entities of the enterprise network;
receive, from at least one of a plurality of hardware probes, storage monitoring data from a server-based SAN monitoring platform, the server-based SAN monitoring platform being in communication with the enterprise network, the storage monitoring data identifying communication between a software-only server-based SAN and entities of the enterprise network;
parse the received traffic data to identify at least one of a plurality of objects or at least one of a plurality of metrics;
parse the received storage monitoring data to identify the at least one of the plurality of objects or the at least one of the plurality of metrics, the parsed traffic data and the parsed storage monitoring data together including the at least one of the plurality of objects and the at least one of the plurality of metrics;
create a metric table entry from the at least one identified metric, the at least one identified metric including properties of the enterprise network and a network flow identifier indicating a sender of the storage monitoring data;
create an object table entry from the at least one identified object, the at least one identified object identifying an object of the enterprise network and an object unique identifier, the object of the enterprise network including an application of the enterprise network;
link one of a plurality of metric table entries with at least one of a plurality of object table entries using the network flow identifier indicating the sender and the object unique identifier;
assign an object performance threshold to the at least one identified object based on a service level agreement associated with the at least one identified object;
compare the object performance threshold to the metric table entry;
if an alarm trigger condition is satisfied based on the comparison, then trigger an alarm event; and
output an alarm notification, the alarm notification based on the alarm event, the alarm notification identifying the object data of the enterprise network and the assigned object performance threshold.

2. The system of claim 1 wherein the object performance threshold is based at least on a type of object of the enterprise network.

3. The system of claim 1 wherein the instructions further configured to control the one or more processors to:
receive application data, the application data including:
a plurality of application identifiers, the application identifier identifying at least one of a plurality of application instances of the enterprise network;
a tier of service of that particular application instance; and
a mapping of each of the plurality of application instances to objects of the enterprise network.

4. The system of claim 3 wherein the tier of service for each of the plurality of application instances are retrieved from an IT management software.

5. The system of claim 3 wherein the application data is received from an application discovery system.

6. The system of claim 3 wherein the application data is received from a user of the enterprise network.

7. The system of claim 3 wherein the object performance threshold is based at least on the tier of service of object of the enterprise network.

8. The system of claim 7 wherein the object performance threshold is configured by a user of the enterprise network.

9. The system of claim 1 wherein the object performance threshold is a tiered object performance threshold.

10. A method comprising:
receive network traffic data from a network traffic monitoring platform, the network traffic monitoring platform being in communication with an enterprise network, the network traffic data identifying communication between entities of the enterprise network;
receive, from at least one of a plurality of hardware probes, storage monitoring data from a server-based SAN monitoring platform, the server-based SAN monitoring platform being in communication with the enterprise network, the storage monitoring data identifying communication between a software-only server-based SAN and entities of the enterprise network;

parsing the received traffic data to identify at least one of a plurality of objects or at least one of a plurality of metrics;

parsing the received storage monitoring data to identify the at least one of the plurality of objects or the at least one of the plurality of metrics, the parsed traffic data and the parsed storage monitoring data together including the at least one of the plurality of objects and the at least one of the plurality of metrics;

creating a metric table entry from the at least one identified metric, the metric data including properties of the enterprise network and a network flow identifier indicating a sender of the storage monitoring data;

creating an object table entry from the at least one identified object, the at least one identified object identifying an object of the enterprise network and an object unique identifier, the object of the enterprise network including an application of the enterprise network;

linking one of a plurality of metric table entries with at least one of a plurality of object table entries using the network flow identifier indicating the sender and the object unique identifier;

assigning an object performance threshold to the at least one identified object based on a service level agreement associated with the at least one identified object;

comparing the object performance threshold to the metric table entry;

if an alarm trigger condition is satisfied based on the comparison, then triggering an alarm event; and outputting an alarm notification, the alarm notification based on the alarm event, the alarm notification identifying the object data of the enterprise network and the assigned object performance threshold.

11. The method of claim 10 wherein the object performance threshold is based at least on a type of object of the enterprise network.

12. The method of claim 10 further comprising:
receiving application, the application data including:
 a plurality of application identifiers, the application identifier identifying at least one of a plurality of application instances of the enterprise network;
 a tier of service of that particular application instance; and
 a mapping of each of the plurality of application instances to objects of the enterprise network.

13. The method of claim 12 wherein the tier of service for each of the plurality of application instances are retrieved from an IT management software.

14. The method of claim 12 wherein the application data is received from an application discovery system.

15. The method of claim 12 wherein the application data is received from a user of the enterprise network.

16. The method of claim 10 wherein the object performance threshold is configured by a user of the enterprise network.

17. A computer program product comprising a non-transitory computer readable storage medium having program code embodied therewith, the program code executable by a computing system to cause the computing system to perform:

receiving network traffic data from a network traffic monitoring platform, the network traffic monitoring platform being in communication with an enterprise network, the network traffic data identifying communication between entities of the enterprise network;

receiving, from at least one of a plurality of hardware probes, storage monitoring data from a server-based SAN monitoring platform, the server-based SAN monitoring platform being in communication with the enterprise network, the storage monitoring data identifying communication between a software-only server-based SAN and entities of the enterprise network;

parsing the received traffic data to identify at least one of a plurality of objects or at least one of a plurality of metrics;

parsing the received storage monitoring data to identify the at least one of the plurality of objects or the at least one of the plurality of metrics, the parsed traffic data and the parsed storage monitoring data together including the at least one of the plurality of objects and the at least one of the plurality of metrics;

creating a metric table entry from the at least one identified metric, the at least one identified metric including properties of the enterprise network and a network flow identifier indicating a sender of the storage monitoring data;

creating an object table entry from the at least one identified object, the at least one identified object identifying an object of the enterprise network and an object unique identifier, the object of the enterprise network including an application of the enterprise network;

linking one of a plurality of metric table entries with at least one of a plurality of object table entries using the network flow identifier indicating the sender and the object unique identifier;

assigning an object performance threshold to the at least one identified object based on a service level agreement associated with the at least one identified object;

comparing the object performance threshold to the metric table entry;

if an alarm trigger condition is satisfied based on the comparison, then triggering an alarm event; and outputting an alarm notification, the alarm notification based on the alarm event, the alarm notification identifying the object data of the enterprise network and the assigned object performance threshold.

18. The computer program product of claim 17 wherein the object performance threshold is based at least on a type of object of the enterprise network.

19. The computer program product of claim 17 wherein the program code executable by the computer system further case the computing system to perform:

receiving application data, the application data including:
 a plurality of application identifiers, the application identifier identifying at least one of a plurality of application instances of the enterprise network;
 a tier of service of that particular application instance; and
 a mapping of each of the plurality of application instances to objects of the enterprise network.

* * * * *